United States Patent [19]
Morita et al.

[11] Patent Number: 6,067,097
[45] Date of Patent: May 23, 2000

[54] DRAWING PROCESSING APPARATUS

[75] Inventors: Masao Morita; Kazuto Hayashi, both of Nakai-machi, Japan

[73] Assignee: Fuji Xerox Co., Ltd., Tokyo, Japan

[21] Appl. No.: 09/066,709

[22] Filed: Apr. 27, 1998

[30] Foreign Application Priority Data

May 2, 1997 [JP] Japan ...................................... 9-114835

[51] Int. Cl.[7] .................................................. G06F 15/80
[52] U.S. Cl. ............................ 345/505; 709/104; 358/1.1
[58] Field of Search ............................. 758/1.1; 709/104, 709/105; 345/505, 501, 507, 526

[56] References Cited

U.S. PATENT DOCUMENTS

| | | | |
|---|---|---|---|
| 5,426,727 | 6/1995 | Sugiura et al. | 395/167 |
| 5,594,860 | 1/1997 | Gauthier | 395/501 |
| 5,859,956 | 1/1999 | Sugiyama et al. | 395/112 |

Primary Examiner—Kee M. Tung
Attorney, Agent, or Firm—Oliff & Berridge, PLC

[57] ABSTRACT

To equally assign processing to a plurality of processing units which perform drawing processing in parallel. The drawing data generating unit generates vectors from drawing data. The load estimated value calculating means obtains existence frequency of the vectors on each scan line as a load estimated value, and the processing responsibility range assignment unit assigns a drawing processing area within a page to each of the drawing processing units, on the basis of load estimated values and a reference value. The drawing data storage control unit transfers a vector required for drawing processing in a drawing processing area assigned to each of the drawing processing units to a corresponding drawing processing unit. Each of the drawing processing units performs drawing processing using the transferred vector. The processing result storage control unit synthesizes and outputs the results of drawing processing in the drawing processing unit.

19 Claims, 38 Drawing Sheets

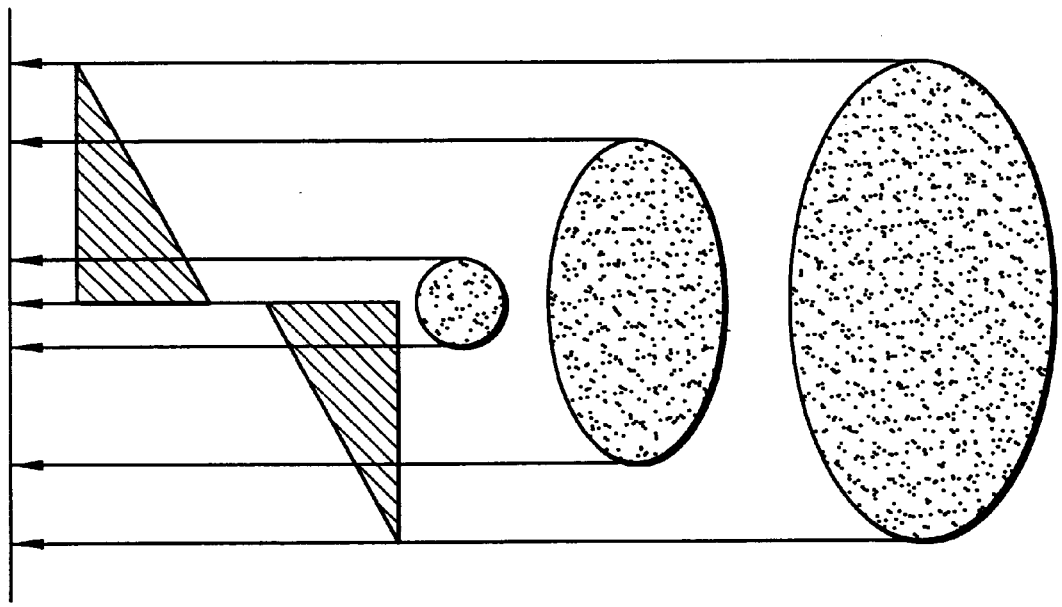
AXIS USED TO ASSIGN PROCESSING BY
THE PROCESSING RESPONSIBILITY
RANGE ASSIGNMENT MEANS
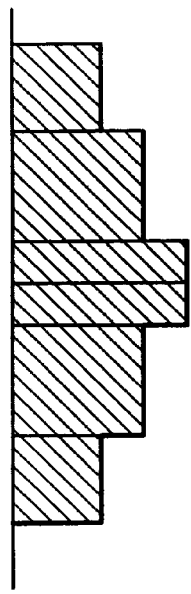
THE EXISTENCE RANGE OF DRAWING DATA IS PROJECTED
ONTO AN AXIS USED TO ASSIGN PROCESSING BY THE
PROCESSING RESPONSIBILITY RANGE ASSIGNMENT MEANS
AND THE NUMBER OF PIECES OF DRAWING DATA IS
ACCUMULATED
FIG.27

| | |
|---|---|
| YMIN | MINIMUM VALUE OF Y COORDINATE |
| YMAX | MAXIMUM VALUE OF Y COORDINATE |
| X1 | X COORDINATE VALUE OF LEFT OBLIQUE LINE IN MINIMUM VALUE OF Y COORDINATE |
| X2 | X COORDINATE VALUE OF RIGHT OBLIQUE LINE IN MINIMUM VALUE OF Y COORDINATE |
| DX1 | INCREMENT OF X COORDINATE VALUE WHEN Y COORDINATE VALUE OF LEFT OBLIQUE LINE IS INCREASED BY UNIT QUANTITY |
| DX2 | INCREMENT OF X COORDINATE VALUE WHEN Y COORDINATE VALUE OF RIGHT OBLIQUE LINE IS INCREASED BY UNIT QUANTITY |
| ATTR | PAINTING ATTRIBUTE SUCH AS COLOR |
| PRIO | PAINTING PRIORITY LEVEL |

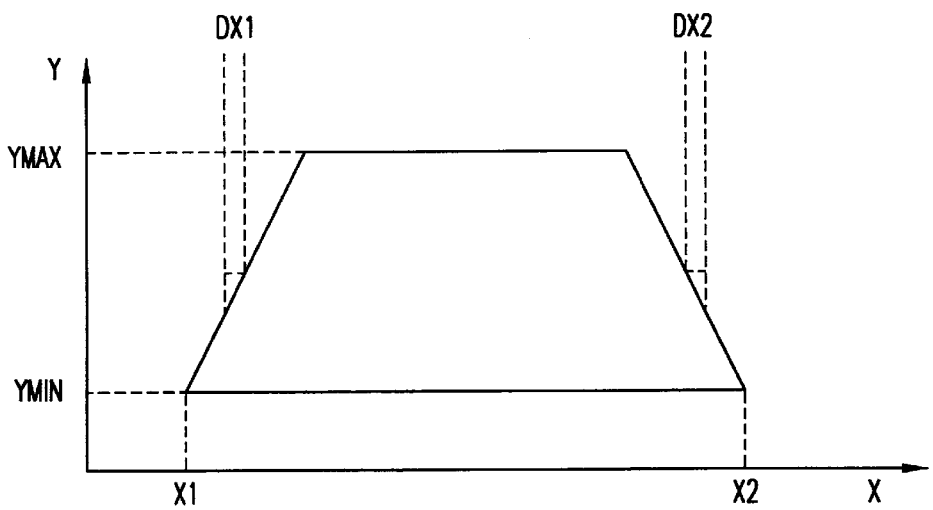

FIG.35

| UNIT AREA | INITIAL STATE | D1 | D2 | D3 | D4 | D5 | D6 |
|---|---|---|---|---|---|---|---|
| R1 | 0 | 1 | 1 | 1 | 1 | 1 | 1 |
| R2 | 0 | 1 | 1 | 1 | 1 | 1 | 1 |
| R3 | 0 | 0 | 1 | 1 | 1 | 1 | 1 |
| R4 | 0 | 0 | 1 | 1 | 1 | 1 | 1 |
| R5 | 0 | 0 | 1 | 1 | 1 | 1 | 2 |
| R6 | 0 | 0 | 1 | 1 | 1 | 1 | 2 |
| R7 | 0 | 0 | 1 | 1 | 1 | 2 | 2 |
| R8 | 0 | 0 | 1 | 1 | 1 | 2 | 2 |
| R9 | 0 | 0 | 1 | 1 | 1 | 2 | 2 |
| R10 | 0 | 0 | 1 | 1 | 1 | 2 | 2 |
| R11 | 0 | 0 | 0 | 1 | 1 | 2 | 2 |
| R12 | 0 | 0 | 0 | 1 | 1 | 2 | 2 |
| R13 | 0 | 0 | 0 | 0 | 1 | 1 | 1 |
| R14 | 0 | 0 | 0 | 0 | 1 | 1 | 1 |
| R15 | 0 | 0 | 0 | 0 | 1 | 1 | 1 |
| R16 | 0 | 0 | 0 | 0 | 1 | 1 | 1 |
| LOAD SUM VALUE | 0 | 2 | 10 | 12 | 16 | 22 | 24 |

FIG.37

| R1 | 1 |
| R2 | 1 |
| R3 | 1 |
| R4 | 1 |
| R5 | 2 |
| R6 | 2 |

[8] TO DRAWING PROCESSING MEANS A

| R7 | 2 |
| R8 | 2 |
| R9 | 2 |
| R10 | 2 |

[8] TO DRAWING PROCESSING MEANS B

| R11 | 2 |
| R12 | 2 |
| R13 | 1 |
| R14 | 1 |
| R15 | 1 |
| R16 | 1 |

[8] TO DRAWING PROCESSING MEANS C

| UNIT AREA | INITIAL STATE | D1 | D2 | D3 | D4 | D5 | D6 |
|---|---|---|---|---|---|---|---|
| R1 | 0 | 2 | 2 | 2 | 2 | 2 | 2 |
| R2 | 0 | 2 | 2 | 2 | 2 | 2 | 2 |
| R3 | 0 | 0 | 2 | 2 | 2 | 2 | 2 |
| R4 | 0 | 0 | 2 | 2 | 2 | 2 | 2 |
| R5 | 0 | 0 | 2 | 2 | 2 | 2 | 4 |
| R6 | 0 | 0 | 2 | 2 | 2 | 2 | 4 |
| R7 | 0 | 0 | 2 | 2 | 2 | 4 | 4 |
| R8 | 0 | 0 | 2 | 2 | 2 | 4 | 4 |
| R9 | 0 | 0 | 2 | 2 | 2 | 4 | 4 |
| R10 | 0 | 0 | 2 | 2 | 2 | 4 | 4 |
| R11 | 0 | 0 | 0 | 2 | 2 | 4 | 4 |
| R12 | 0 | 0 | 0 | 2 | 2 | 4 | 4 |
| R13 | 0 | 0 | 0 | 0 | 2 | 2 | 2 |
| R14 | 0 | 0 | 0 | 0 | 2 | 2 | 2 |
| R15 | 0 | 0 | 0 | 0 | 2 | 2 | 2 |
| R16 | 0 | 0 | 0 | 0 | 2 | 2 | 2 |
| LOAD SUM VALUE | 0 | 4 | 20 | 24 | 32 | 44 | 48 |

AREA OF INITIAL STATE
(1.5+4.5)×1÷2=3

| UNIT AREA | INITIAL STATE | D1 | D1' | D2 | D2' | D3 | D4 | D5 | D6 |
|---|---|---|---|---|---|---|---|---|---|
| R1  | 0 | 2 | 4 | 4 | 4 | 4 | 4 | 4 | 4 |
| R2  | 0 | 2 | 4 | 4 | 4 | 4 | 4 | 4 | 4 |
| R3  | 0 | 0 | 0 | 2 | 4 | 2 | 4 | 4 | 4 |
| R4  | 0 | 0 | 0 | 2 | 4 | 2 | 4 | 4 | 4 |
| R5  | 0 | 0 | 0 | 2 | 4 | 2 | 4 | 4 | 8 |
| R6  | 0 | 0 | 0 | 2 | 4 | 2 | 4 | 4 | 8 |
| R7  | 0 | 0 | 0 | 2 | 4 | 4 | 4 | 8 | 8 |
| R8  | 0 | 0 | 0 | 2 | 4 | 4 | 4 | 8 | 8 |
| R9  | 0 | 0 | 0 | 2 | 4 | 4 | 4 | 8 | 8 |
| R10 | 0 | 0 | 0 | 2 | 4 | 4 | 4 | 8 | 8 |
| R11 | 0 | 0 | 0 | 0 | 0 | 4 | 4 | 8 | 8 |
| R12 | 0 | 0 | 0 | 0 | 0 | 4 | 4 | 8 | 8 |
| R13 | 0 | 0 | 0 | 0 | 0 | 0 | 4 | 4 | 4 |
| R14 | 0 | 0 | 0 | 0 | 0 | 0 | 4 | 4 | 4 |
| R15 | 0 | 0 | 0 | 0 | 0 | 0 | 4 | 4 | 4 |
| R16 | 0 | 0 | 0 | 0 | 0 | 0 | 4 | 4 | 4 |
| LOAD SUM VALUE | 0 | 4 | 8 | 24 | 40 | 48 | 64 | 88 | 96 |

| | | INITIAL STATE | D1 | D2 | D3 |
|---|---|---|---|---|---|
| UNIT AREA | R1 | 0 | 1 | 1 | 1 |
| | R2 | 0 | 1 | 1 | 1 |
| | R3 | 0 | 1 | 1 | 1 |
| | R4 | 0 | 1 | 3 | 3 |
| | R5 | 0 | 1 | 3 | 3 |
| | R6 | 0 | 1 | 3 | 3 |
| | R7 | 0 | 1 | 3 | 6 |
| | R8 | 0 | 1 | 3 | 6 |
| | R9 | 0 | 1 | 3 | 6 |
| | R10 | 0 | 1 | 3 | 6 |
| | R11 | 0 | 1 | 3 | 6 |
| | R12 | 0 | 1 | 3 | 6 |
| | R13 | 0 | 1 | 3 | 3 |
| | R14 | 0 | 1 | 1 | 1 |
| | R15 | 0 | 1 | 1 | 1 |
| | R16 | 0 | 1 | 1 | 1 |
| LOAD SUM VALUE | | 0 | 16 | 36 | 54 |

FIG.59

| R1 | 1 |
| R2 | 1 |
| R3 | 1 |
| R4 | 3 |
| R5 | 3 |
| R6 | 3 |
| R7 | 6 |
| R8 | 6 |
| R9 | 6 |
| R10 | 6 |
| R11 | 6 |
| R12 | 6 |
| R13 | 3 |
| R14 | 1 |
| R15 | 1 |
| R16 | 1 |

R1–R7: 18 TO DRAWING PROCESSING MEANS A
R8–R10: 18 TO DRAWING PROCESSING MEANS B
R11–R16: 18 TO DRAWING PROCESSING MEANS C

INITIAL STATE

| UNIT AREA | |
|---|---|
| R1 | 0.2 |
| R2 | 0.2 |
| R3 | 0.2 |
| R4 | 0.2 |
| R5 | 0.2 |
| R6 | 0.2 |
| R7 | 0.2 |
| R8 | 0.2 |
| R9 | 0.2 |
| R10 | 0.2 |
| R11 | 0.2 |
| R12 | 0.2 |
| R13 | 0.2 |
| R14 | 0.2 |
| R15 | 0.2 |
| R16 | 0.2 |

LOAD SUM VALUE  3.2

FIG.61

# DRAWING PROCESSING APPARATUS

BACKGROUND OF THE INVENTION

1. Field of the Invention

The present invention relates to a drawing processing apparatus, and more particularly to a drawing processing apparatus which performs drawing processing by inputting drawing instructions.

2. Description of the Prior Art

Presently, page printers execute printing by inputting PDL (page description language) such as Interpress (a trademark of U.S. Xerox Corporation) and PostScript (a trademark of U.S. Adobe Systems Incorporated).

Printing by input of such PDLs requires imaging processing which converts data of a PDL format into data of a format suitable for a raster output device. However, the imaging processing generally requires a very long time, posing a problem to a system which makes output to a high-speed page printer.

For example, although some color high-speed page printers have an output capacity of 40 sheets or more per minute, image processing requires from tens of seconds to several minutes, making it difficult to deliver the full capacity of expensive page printers. Accordingly, to perform imaging processing rapidly, parallel drawing processing is required.

FIG. 1 shows a drawing area split equally for parallel drawing. A drawing element 4 in this figure is complicatedly overlapped with a number of elements at the center of the drawing area. For such a drawing element 4, with the area being equally split into a plurality of subareas, parallel processing is performed in the drawing processing sections 1 to 3.

However, as described above, even if the area of the drawing element 4 is equally split and the resulting subareas are equally assigned to the drawing processing sections 1 to 3, because of the complexity of drawing elements themselves such as the number of drawing elements and the overlapping of different graphics, different loads are put on the drawing processing sections 1 to 3.

FIG. 2 shows the respective drawing processing operation timings of the drawing processing sections shown in FIG. 1. A processing time per unit drawing area shown by the timings includes influences caused by the degree of overlapping among different drawing elements in addition to the number of drawing elements belonging to each area. The figure shows that a load concentrates on the drawing processing section 3 in charge of more complex drawing elements than in the drawing processing sections 1 and 2, so that other drawing processing sections 1 and 2 are driven into a wait state.

Performing parallel drawing processing with a drawing area being equally split as described above poses a problem in that processing of a drawing processing section assigned a heavy load slows down and the effect of parallel drawing processing is reduced.

SUMMARY OF THE INVENTION

The present invention has been made in consideration of the above-mentioned problem, and it is an object of the present invention to provide a drawing processing apparatus which performs quick parallel drawing processing by assigning drawing processing ranges so that loads are evenly spread using load estimated values.

According to a first aspect of the present invention, to achieve the above-mentioned object, a drawing processing apparatus comprises:

input means for inputting drawing data produced by coding in prescribed drawing instructions a drawing object on a page composed of a prescribed number of scanning lines;

load estimated value calculating means, on the basis of the drawing data inputted to the input means, for calculating a load estimated value in response to existence frequency of vectors constituting the outline of at least the drawing object on each of the scanning line;

a plurality of drawing processing means for drawing the drawing object;

processing area assignment means, on the basis of the load estimated values and a load reference value, for splitting the page into a plurality of partial drawing processing areas and assigning the partial drawing processing area to each of the drawing processing means;

transfer control means for transferring the vectors required for drawing processing in the partial drawing processing area assigned by the processing area assignment means to a corresponding drawing processing means; and output means for synthesizing and outputting the results of drawing processing by each of the drawing processing means.

With this configuration, a load estimated value is generated for each scanning line, which is a page configuration unit, the page is split into areas so that an accumulated load estimated value in each split area becomes virtually equal. Accordingly, the loads on drawing processing means assigned for processing in split areas are equalized and the number of wait states is reduced, and as a result, the overall throughput is improved.

Further, with this configuration, until the summation of the load estimated values calculated by the load estimated value calculating means reaches the reference value, the processing area assignment means can assign an area determined by the scanning lines, corresponding to the load estimated value, to each of the drawing processing means.

The reference value can be determined based on a value obtained by dividing the accumulated total load estimated value of the drawing data, obtained in accordance with the load estimated values calculated by the load estimated value calculating means, by the number of the drawing processing means.

The transfer control means repeatedly transfers the vectors required for drawing processing in the partial drawing area to the corresponding drawing processing means, and the reference value can be determined based on a value resulting from further division of a value found by dividing the accumulated total load estimated value by the number of the drawing processing means, by the number of repeated transfers by the transfer control means.

The load estimated value can be calculated in response to existence frequency of vectors respectively constituting the outline of the drawing object and the outline of clip object, on each of the scanning lines.

According to a second aspect of the present invention, to achieve the above-mentioned object, a drawing processing apparatus comprises:

input means for inputting drawing data produced by coding in a prescribed page description language a drawing object on a page comprised of a prescribed number of scanning lines;

load estimated value calculating means for forming a plurality of drawing elements containing at least part of the drawing object from the drawing object of the drawing data inputted to the input means, and for finding a load estimated value in accordance with the prescribed attributes of the drawing elements:

a plurality of drawing processing means for performing drawing processing on the drawing object;

processing area assignment means for splitting the page into partial drawing processing areas on the basis of the load estimated values calculated by the load estimated value calculating means and a load reference value, and for assigning the partial drawing processing area to each of the drawing processing means;

transfer control means for transferring the drawing element required for drawing processing in the partial drawing processing area assigned by the processing area assignment means to the corresponding drawing processing means; and output means for synthesizing and outputting the results of drawing processing by each of the drawing processing means.

With this configuration, by splitting a drawing processing area using load estimated values in accordance with the attributes of drawing elements, the loads on the drawing processing means are equalized, the number of wait states is reduced, and as a result, the overall throughput is improved.

With this configuration, the drawing element can be a trapezoidal graphic. In this case, the attribute of the drawing element can be the area of the trapezoid or existence frequency on each of the scanning lines.

The drawing element can be a minimum rectangle surrounding at least part of the drawing object and the prescribed attribute of the load estimated value calculating means can be the area of the rectangle.

The drawing element can be run-length data. In this case, the attribute of the drawing element can be the run length of run-length data or existence frequency on each of the scanning lines.

The drawing element contains at least vector data, a trapezoidal graphic, run-length data, and one of minimum rectangles surrounding at least part of the drawing object, and the prescribed attribute of the load estimated value calculating means can be determined using the value of one of existence frequency of at least vector data on each of the scanning lines, the area of a trapezoidal graphic, existence frequency of a trapezoidal graphic on each of the scanning lines, run length of run-length data, existence frequency of run-length data on each of the scanning lines, and the area of minimum the rectangle surrounding at least part of the drawing object.

The prescribed attribute of the load estimated value calculating means can also assume a different coefficient for each of the types of painting the drawing element.

According to a third aspect of the present invention, a drawing processing apparatus comprises:

input means for inputting drawing data produced by coding a drawing object in prescribed drawing instructions on a page basis;

load estimated value calculating means for calculating a load estimated value in a configuration unit of the page on the basis of the drawing data inputted to the input means;

a plurality of drawing processing means for performing drawing processing for the drawing object;

processing area assignment means, on the basis of the load estimated values calculated by the load estimated value calculating means and a load reference value, for splitting the page into partial drawing processing areas and assigning the partial drawing processing area to each of the drawing processing means;

transfer control means for transferring the drawing element required for drawing processing in the partial drawing processing area assigned by the processing area assignment means to one of the corresponding drawing processing means; and output means for synthesizing and outputting the results of drawing processing by each of the drawing processing means.

With this configuration, by splitting a drawing processing area using load estimated values calculated for each configuration unit of page, the loads on the drawing processing means are equalized, the number of wait states is reduced, and as a result, the throughput of drawing processing is improved.

Hereinafter, the present invention will be explained in detail with reference to the accompanying drawings. FIG. 3 illustrates the principle of a drawing processing apparatus according to the present invention. In FIG. 3, a drawing processing apparatus 100 comprises drawing data input means 10, drawing data generating means 11, load estimated value calculating means 12, drawing data storage control means 13, processing responsibility range assignment means 14, a plurality of drawing processing means 15, and processing result storage control means 16. The output of the drawing processing apparatus 100 is supplied to an output apparatus 200.

The drawing data input means 10 inputs drawing data. The drawing data is produced by coding in a prescribed page description language a drawing object on a page composed of a prescribed number of scanning lines. The drawing data generating means 11 generates vectors constituting the outline of the drawing object from the drawing data. The load estimated value calculating means 12 obtains existence frequency of the vectors on each of the scanning lines as a load estimated value, and the processing responsibility range assignment means 14 assigns drawing processing areas within the page to each of the drawing processing means 15 on the basis of the load estimated values and a reference value. The reference value can be common to the drawing processing means 15. A specific reference value may be used depending on the performance or special factors of the drawing processing means 15. The drawing data storage control means 13 transfers a vector required for drawing processing in a drawing processing area assigned to each of the drawing processing means 15 to a corresponding drawing processing means 15. Each of the drawing processing means 15 performs drawing processing using the transferred vector. The processing result storage control means 16 synthesizes and outputs the results of drawing processing in the drawing processing means 15. The output apparatus 200 prints images.

The means described above are initialized and processing is started, terminated, and synchronized under control by a control means not shown in the figure.

FIG. 4 is a conceptual diagram of a system to which a drawing processing apparatus according to the present invention is applied. In this system, a drawing processing apparatus 100 is connected to a network 300 via a network interface 400. An output apparatus 200 is connected to output the processing results from the drawing processing apparatus 100.

In the system, data for drawing output is sent from a client computer not shown in the figure via the network and a leased line. The data for drawing output is received and processed in the drawing processing apparatus via the network interface. The processed data is transferred to the output apparatus and an image is reproduced on media such as paper and film.

As described above, the present invention can be embodied in an apparatus which receives drawing data from a client computer via a network or leased communication line and converts the data into data for an output apparatus such as a printer. Of course, the present invention can also be embodied in other embodiments.

FIG. 5 is a flowchart showing the flow of the overall processing of the drawing processing apparatus 100. Herein, a simplified example of the flow of processing for one page is shown.

In FIG. 5, when a drawing description file is inputted, an initialization instruction is issued to the drawing data storage control means 13, processing result storage control means 16, processing responsibility range assignment means 14, and drawing processing means 15 to perform initialization processing (S10). To generate drawing data from the inputted drawing description file, a command to start processing is issued to the drawing data generating means 11 (S11). Thereafter, when the drawing description processing has generated as many pieces of drawing data as a prescribed number of drawing areas or a prescribed number of data areas of the drawing description file, a command to start drawing processing is issued to the drawing processing means (S12). Subsequently, when the control means not shown in FIG. 3 is notified by the drawing processing means 15 that processing of a plurality of drawing processing means 15 has terminated, or is notified by the processing responsibility range assignment means 14 that unprocessed drawing areas have run out, the control means transfers the data of the processing result storage control means 16 to the output apparatus 200 (S13).

Next, individual means of the drawing processing apparatus 100 will be explained in detail.

When commanded to start processing, the drawing data generating means 11 (FIG. 3) reads drawing description data, which is a page description language, converts it into drawing data of a form processable to the drawing processing means 15, and transfers it to the drawing data storage control means 13. The drawing data generating means 11 determines whether the drawing data is already inputted; terminates if already inputted; otherwise, returns to processing of the next drawing description data.

FIG. 6 shows an example of the structure of drawing data processed by the drawing data generating means 11. In FIG. 6, "ID" denotes a drawing order indicating the order of overpainting. "X" denotes the X intercept of a vector crossing a current scanning line. "X displacement" indicates a change quantity of the X intercept when processing is transferred to the next scanning line. "Y displacement" indicates the number of remaining scanning lines affected by a relevant vector. "Direction" indicates the direction of a relevant vector.

The vector in FIG. 6 will be explained more specifically using FIG. 7. In FIG. 6, a coordinate system has an origin at an upper left position of the drawing, and accordingly X coordinate values increase in a horizontal, right direction of the drawing and Y coordinate values increase in a vertical, downward direction of the drawing. A vector shown in FIG. 7 (a) has coordinates (100, 100) at a starting point P1 and coordinates (200, 200) at an ending point P2. In the case of this vector, for example, "ID" is α, "X" indicating the value of the X intercept on a scanning line is 100, a change quantity "X displacement" of the X intercept at movement to the next scanning line is 1, and the number of remaining scanning lines "Y displacement" is 100. The "direction" of the vector is defined as 1 for the direction in which the Y direction of the coordinate system increases, and as −1 for the direction in which the Y direction of the coordinate system decreases. Accordingly, the "direction" of the vector in FIG. 7 (a) is 1. The "direction" is used as information indicating in which direction the scanning lines are crossed during the inside/outside determination in the winding rules. FIG. 7 (b) shows the case where "direction" is −1.

Except for the values concerning a drawing area shown in FIG. 6, color and other drawing attribute values are stored in other areas not shown in the figure.

The drawing data generating means 11 uses the vector representation to generate drawing data representing the outside shape of graphics. FIG. 8 uses a triangle as an example for explanation. As shown in FIG. 8, a triangle represented by three points P1 (0, 300), P2 (600, 0), and P3 (300, 600) is used as an example. Three vectors P1P2, P2P3, and P3P1 are generated from the three points, with vector directions taken into account. For P1P2, "X" is 600, "X displacement" is −2, "Y displacement" is 300, and "Direction" is −1. Other vectors are as shown in FIG. 8.

An area surrounded by the three vectors is the inside area of the graphic. "Inside state" explained later means that coordinates subject to processing are within an inside area and "outside state" denotes that coordinates subject to processing are outside an inside area. Although a plurality of methods are available to differentiate between the inside and outside, a method for determining the inside state is specified for each graphic, and in accordance with the specification, a distinction between the inside and outside is made. In this example, an area surrounded by three vectors is determined to be inside. In the case of graphics of more complicated shape, for example, when another graphic specifying a shape of its own exists in the inside of one graphic as typified by a doughnut shape or the like, a distinction between the inside and outside is made depending on the vectors by an inside determination method. What determination method is used in this embodiment will not be explained in more detail because no influence is exerted on an object of the present invention.

Although drawing data to represent a drawing area by the vector representation is used as drawing data to simplify explanation in this embodiment, the drawing data need not be the vector representation. For example, the following representations are permitted: polygonal representation by a dot string, line segment string representation including curves, trapezoid representation having two sides parallel to main scanning lines, and the representation of a drawing area split by triangle, rectangle, and run length.

Next, the load estimated value calculating means 12 will be explained. The load estimated value calculating means 12 calculates an estimated value to equalize loads. A load estimated value is primarily calculated from drawing data, but it may be included in input description data itself. The load estimated value calculating means 12, which is a main feature of the present invention, will be explained in detail in later embodiments.

Next, the drawing data storage control means 13 will be explained. FIG. 9 shows the configuration of the drawing data storage control means 13. A data storage interface 130 receives drawing data from the drawing data generating means 11. A drawing data existence range extracting means 132 detects an existence range with respect to a subscanning line direction (to simplify subsequent explanations, a subscanning line direction will be referred to as a Y direction and a numeric value indicating a position in a subscanning line direction as a Y coordinate value, while a scanning line direction will be referred to as an X direction and a numeric value indicating a position in a scanning line direction as an X coordinate value) from received drawing data.

A drawing data existence range summation means 134 sums up existence ranges in a detected Y direction. A load estimated value registering means 131 stores a load estimated value in a specific range of a drawing area. A load estimation source data interface 135 communicates with the processing responsibility range assignment means 14. A drawing data registering means 133 registers drawing data so that it can be extracted based on at least one of the maximum and minimum values of Y coordinate. A drawing data transmission interface 136 performs communication with the drawing processing means 15.

The drawing data storage control means 13 has at least four major types of processing phases. These are initialization, data storage, drawing data transmission, and transmission of load estimation source data.

FIG. 10 is a flowchart showing the flow of initialization processing of the drawing data storage control means 13. In FIG. 10, the drawing data storage control means 13 initializes the drawing data existence range summation means 134, the drawing data registering means 133, and the load estimated value registering means 131 (S20, S21, and S22).

FIG. 11 is a flowchart showing the flow of processing when the drawing data storage control means 13 receives and stores drawing data from the drawing data generating means 11. In FIG. 11, when data is sent from the drawing data generating means 11 and the load estimated value calculating means 12, it is determined whether the data is drawing data or a load estimated value (S30). If it is drawing data, an existence range of the drawing data in a Y direction is detected by the drawing data existence range extracting means 132 and both ends are registered in the drawing data existence range summation means 134 (S31, S32).

For example, the drawing data existence extracting means 132 extracts the maximum and minimum values of coordinate values of the drawing data in a Y direction. A corresponding counter of the drawing data existence range summation means 134 in which a pair of a counter for counting maximum values and a counter for counting minimum values is provided for each unit Y coordinate is incremented.

Thereafter, when a table of counters shown in examples is referred to, a counter for minimum values is referred to as an incoming counter and a counter for maximum values is referred to as an outgoing counter.

Next, the drawing data is registered in the drawing data registering means (S33). This can be realized in such a way that, with a drawing data table set up in correspondence to a unit area in a Y direction of a drawing area, for example, each piece of the drawing data is registered in a place corresponding to the minimum, e.g., of coordinate values of the Y direction. These operations are performed for all pieces of drawing data generated by the drawing data generating means 11.

On the other hand, in the case of a load estimated value, it is registered in the load estimated value registering means 131 (S34). For the load estimated value registering means 131 as well, this can be similarly realized in such a way that, with a table set up in correspondence to a unit area in a Y direction of a drawing area, for example, the received data is registered in the table area.

In this embodiment, a tabular data structure is used in the drawing data existence range summation means 134, drawing data registering means 133, load estimated value registering means 131, and the like within the drawing data storage control means 13. This is done to simplify explanation; other data structures may be used. The use of other various structures such as list structure, tree structure, and hashing mechanism also provides the same effect.

Subsequently, whether the drawing data is already inputted is determined (S35). If so, the drawing data storage control means 13 terminates; otherwise, returns to processing of the next drawing data.

FIG. 12 is a flowchart showing the flow of processing when drawing data is sent from the drawing data storage control means 13 to the drawing processing means 15. In FIG. 12, on receiving a request to transfer drawing data, the drawing data storage control means 13 extracts the drawing data registered in a requested range and sends it to the drawing processing means 15 of a transfer request source (S40, S41). At this time, all extracted drawing data can be sent, or extracted data can be sent after the data not existing in one end of a requested range is removed.

Next, the processing responsibility range assignment means 14 will be explained. Before explaining the processing responsibility range assignment means 14 itself, processing related to the processing responsibility range assignment means 14 will be explained. FIG. 13 is a flowchart showing the flow of control processing related to the processing responsibility range assignment means 14. The processing responsibility range assignment means 14 splits a drawing area and assigns processing responsibilities to the drawing processing means 15. The drawing area is split by calculating load estimated values of drawing processing in the split drawing area.

Thereafter, the smallest split unit in a Y direction is called a unit drawing area, and an area assigned to each drawing processing means 15 with a size and a position determined by the processing responsibility range assignment means is called a distributed drawing area. For example, a unit drawing area ranges from one scanning line to the number of drawing processing means and a distributed drawing area contains several to tens of unit drawing areas.

In FIG. 13, when determining a distributed area, the processing responsibility range assignment means 14 calculates a load estimated value when a distributed drawing area to be assigned is processed by each drawing processing means 15. At this time, for a range to calculate a load estimated value for, the data registered in the drawing data existence range summation means 134 explained in FIG. 9 and the data registered in the load estimated value registering means 131 explained in FIG. 9 are requested to the drawing data storage control means 13 (S50, S51).

For this request, the drawing data storage control means 13 searches the drawing data existence range summation means 134 and the load estimated registering means 131 on the basis of a specified position to collect data, and sends the collected data to the processing responsibility range assignment means 14 via the load estimated source data interface 135 (S52).

Next, the processing responsibility range assignment means 14 will be explained. FIG. 14 shows the configuration of the processing responsibility range assignment means. In FIG. 14, an exclusive interface 140 accepts a request from one of the drawing processing means 15. The range of a distributed drawing area determined by the distributed drawing processing area determination means 141 is notified. The distributed drawing area range is determined so that a load estimated value of the distributed drawing area matches a prescribed reference value.

Thereafter, a load estimated value of a unit area is called a unit load estimated value and a load estimated value of a distributed area is called a distributed load estimated value.

The prescribed reference value is held within the distributed drawing processing area determination means 141, and is supplied by the control means not shown in the figure. For example, a distributed drawing area is successively extended until a distributed load estimated value exceeds the prescribed reference value, at which time the distributed drawing area can be determined. The reference value itself can be calculated in advance using a load estimated value.

A drawing range determination means 142 determines the state in which a drawing area to be processed has become nonexistent with the progress of drawing processing. An unprocessed position holding means 143 is a holding means for holding an unprocessed position in a Y direction, which is updated by the drawing processing means 15 when assigning a unit drawing processing area. The unit load estimated value calculating means 144 calculates a unit load estimated value for each unit drawing area. After the unit load estimated value is calculated for each unit drawing area, it is coupled across a plurality of unit drawing areas by operations such as addition, for example, and a distributed load estimated value of a distributed drawing area is calculated.

A load estimated source data holding means 145 stores load estimated source data calculated from a summation value and other values of a drawing data existence range obtained through communication with the drawing data storage control means 13.

FIG. 15 is a flowchart showing the flow of processing of the processing responsibility range assignment means. The processing responsibility range assignment means 14, which is initialized at the start of overall processing, performs the following processing for an inquiry from the drawing processing means.

In FIG. 15, requests from the drawing processing means 15 are access-controlled by the exclusive interface 140; only one of concurrent requests from a plurality of drawing processing means 15 is accepted (S60). When a request to assign a responsibility range is made, the processing responsibility range assignment means 14 references the drawing range determination means 142 and determines whether an unprocessed drawing area still exists (S61). If an unprocessed drawing area no longer exists, the processing responsibility range assignment means 14 notifies a requesting drawing processing means 15 of the fact and goes to the determination of a distributed area to be assigned (S62).

If an unprocessed drawing area still exists, the processing responsibility range assignment means 14 calculates a unit load estimated value in order from the position held in the unprocessed position holding means 143 (S63). The processing responsibility range assignment means 14 calculates a unit load estimated value by the same processing in order from the position held in the unprocessed position holding means 143, accumulates it, calculates a distributed load estimated value (S64), and determines whether the accumulated value exceeds a prescribed value (S65). If not so, the processing responsibility range assignment means 14 returns to processing of the next unprocessed unit area. However, even when the prescribed value is not exceeded, processing may terminate to equalize loads.

The processing responsibility range assignment means 14 determines whether a distributed drawing area to be assigned exists (S66). If not so, the processing responsibility range assignment means 14 notifies the requesting source that there is no drawing area to be assigned (S69). If there is a drawing area to be assigned, the processing responsibility range assignment means 14 sends it to the requesting drawing processing means 15 and updates the position held in the unprocessed position holding means 143 to the next unprocessed position (S67, S68).

Next, the drawing processing means 15 will be explained. One of the internal configurations of a plurality of drawing processing means 15 will be explained because they are the same. Of course, the internal configurations can be different for each of the drawing processing means 15. FIG. 16 shows the configuration of the drawing processing means 15. In FIG. 16, a processed drawing position holding means 151 holds a processed drawing position. A responsibility drawing range holding means 150, which holds a specified drawing processing range obtained from the processing responsibility range assignment means 14, can be realized by semiconductor storage, magnetic disk unit, or the like.

A drawing data holding means 152 temporarily holds drawing data obtained from the drawing data storage control means 13, and also holds drawing data taken over from other drawing areas processed previously. The drawing data holding means 152 can also be realized by various storage methods such as semiconductor storage.

When a drawing processing position goes out of the existence range of drawing data held within the drawing data holding means because a drawing position subject to processing of a drawing feature was updated, the drawing data check/discard means 153 removes the drawing data from an object of processing of the drawing feature to improve the processing efficiency of the drawing feature and reduce the storage capacity required for the drawing data holding means.

The drawing feature 154 internally holds a drawing position and processes data within the drawing data holding means by using a drawing processing buffer 155 as a work area, and converts it into processing result data that can take correspondence with raster image data with respect to a specified drawing area. Various types of processing result data are possible: raster image data, run-length data represented by a range of X direction and colors, data resulting from compressing these data-by-data compression techniques, and other data.

The drawing feature 154 can store a processing result in the processing result storage control means 16 for each unit drawing area. Alternatively, several processing results can also be collected before being stored in the processing result storage control means 16.

FIG. 17 is a flowchart showing the flow of processing of the drawing processing means 15. In FIG. 17, the drawing processing means 15 is commanded to start operation when data in a prescribed range is stored in the drawing data storage control means 13. At the start of processing, the processed drawing position holding means 151 and the drawing data holding means 152 are initialized (S70). On termination of initialization, the drawing processing means 15 makes an inquiry about the range of a drawing area to take responsibility for to the processing responsibility range assignment means (S71). When the drawing area to take the responsibility for is specified, the drawing processing means 15 stores it in the responsibility drawing range holding means 150 and sets a drawing processing position in one end of the range stored in the responsibility drawing range holding means 150 (S72).

The drawing data check/discard means 153 checks the drawing data held in the drawing data holding means 152, and selects and discards drawing data having exerted no influence on a drawing position (S73). The drawing processing means 15 asks the drawing data storage control means 13 for drawing data using the data consisting of a combination of a position stored in the processed drawing position holding means 151 and a drawing processing position (S74). In this case, drawing data exerting no influence on the drawing position is not read or is discarded after being read. The drawing processing means 15 determines whether processing of a drawing area to take responsibility for terminates, and if not so, updates the drawing position, and otherwise terminates (S76, S77).

The drawing data held in the drawing data holding means 152 is processed using a drawing buffer 155 by the drawing feature 154, and processing result data is created (S75). Numerous proposals are offered to exert the functions of the drawing feature at this stage, and any appropriate one of them may be used in accordance with the type of output result data. Herein, painting and clipping are performed in X direction to create run-length data for each scanning line by holding vector data existing on a scanning line being processed in the drawing processing buffer 155, "ID" of graphic indicating current painting, color information, and drawing start position, and graphic in an inside state. The outline of this processing is shown in FIG. 18. Herein, vectors existing on the current scanning line to be processed are already held in the drawing data holding means. This is called an active table.

In FIG. 18, when drawing processing is started, the active table is checked (S80), and if it is empty, because no processing is required, empty scanning lines are outputted and processing terminates (S89). If the active table is not empty, vectors in the active table are sorted by X direction (S81). Next, the vectors are fetched from the active table (S82) in ascending or descending order. Next, whether the type of a vector is a clip or graphic is determined by the type/inside evaluation processing, and further, classification is made to five states by determining whether a graphic represented by the vector becomes an inside state (S83). One state is clip area start (S84), indicating that the type is clip and a clip represented by the vector becomes an inside state. The second state is clip area end (S85), indicating that the type is clip and a clip represented by the vector becomes an outside state. The third state is graphic area start (S86), indicating that the type is graphic and a clip represented by the vector becomes an inside state. The fourth state is graphic area end (S87), indicating that the type is graphic and a clip represented by the vector becomes an outside state. The fifth state is the one that exerts no influence on drawing data represented by the vector regardless of the type. Processing is performed for each of the five states.

In clip area start processing (S84), of graphics already in an inside state and influenced by the clip, one having the highest priority is selected on the basis of priority "ID", which is part of graphic drawing data. "ID" of a graphic previously registered to start painting and "ID" of the current graphic are compared, and if the graphic adopted this time has higher priority, by using color information of the previous graphic, painting is performed from the drawing start position of the previous graphic to the X coordinate value −1 of the vector. If the previous state is an empty state, painting is performed in a color indicating an empty state. "ID" of the graphic adopted this time, color information, and the X coordinate value of the vector are registered as a drawing start position. If the graphic adopted this time has lower priority, or graphics already in an inside state, influenced by the clip do not have the highest priority, no processing is performed.

In clip area end processing (S85), all graphics already in an inside state, influenced by the clip, are qualified. If a graphic previously registered to start painting is contained in the qualified graphics, by using color information of the graphic, painting is performed from the drawing start position to the X coordinate value −1 of the vector. Next, "ID" of a graphic having the highest priority of graphics in an inside state and not influenced by the clip, color information, and the X coordinate value of the vector are registered as a drawing start position. If there are no graphics in an inside state, "ID" indicating an empty state, color information of an empty state, the X coordinate value of the vector are registered as a drawing start position.

In graphic area start processing (S86), the inside state of a clip influenced by the graphic is checked, and if the clip is in an inside state, "ID" of a graphic previously registered to start painting and "ID" of the current graphic are compared, and if the current graphic has higher priority, by using color information of the previous graphic, painting is performed from the drawing start position of the previous graphic to the X coordinate value −1 of the vector. If the previous state is an empty state, painting is performed in a color indicating an empty state. If the current graphic has lower priority, or the clip influenced by the graphic is not in an inside state, the graphic is registered as a graphic in an inside state.

In graphic area end processing (S87), if the graphic is the one previously registered to start painting, by using color information of the graphic, painting is performed from a drawing start point to the X coordinate value −1 of the vector. Next, the graphic is released from the inside state. Then, "ID" of a graphic having the highest priority, of graphics in an inside state, color information, and the X coordinate value of the vector are registered as a drawing start position.

In area continuous processing, no processing is performed.

After the five states are processed, in order to determine whether to terminate processing, it is determined whether vectors still exist in the active table, and if so, processing is continued and a vector is fetched again from the active table. If not so, the remaining scanning lines not subjected to painting processing are transferred to the processing result storage control means 16 and processing terminates.

The drawing feature 154 advances a drawing position after transferring processing results to the processing result storage control means 16 and recording a processed drawing position in the processed drawing position holding means 151. If a drawing position is within a drawing area to take responsibility for, the same processing is repeated by processing the data within the drawing data holding means 152.

In the processing process of the drawing processing means 15, an exceptional operation is performed when it is reported from the processing responsibility range assignment means 14 that there is no unprocessed area to take responsibility for within the drawing area.

Load estimated values in accordance with the prescribed attribute of a drawing element of a drawing object include the number of starting points of a display list in addition to the existence frequency of vector on each scanning line. By using the attribute data of a display list for estimation at the stage of putting a description language into a display list, the area of a drawing object, the total area of drawing objects, the number of change points of color at a coordinate point, the number of object overlapping depth levels, and the total number of object overlapping depth levels can be used as load estimated values in accordance with the prescribed attribute of drawing elements.

BRIEF DESCRIPTION OF THE DRAWINGS

FIG. 27 is a conceptual diagram for load estimation in an embodiment.

FIG. 35 shows an example of trapezoid-split data.

FIG. 37 shows changes of values of a unit load estimated value table.

FIG. 38 shows an example of the result of splitting and processing assignment.

FIG. 59 shows changes of values of a unit load estimated value table.

FIG. 60 shows an example of the result of splitting and processing assignment.

FIG. 61 is an explanatory diagram when a constant is used as an initial value.

DESCRIPTION OF THE REFERENCE NUMERALS

Figure 1:
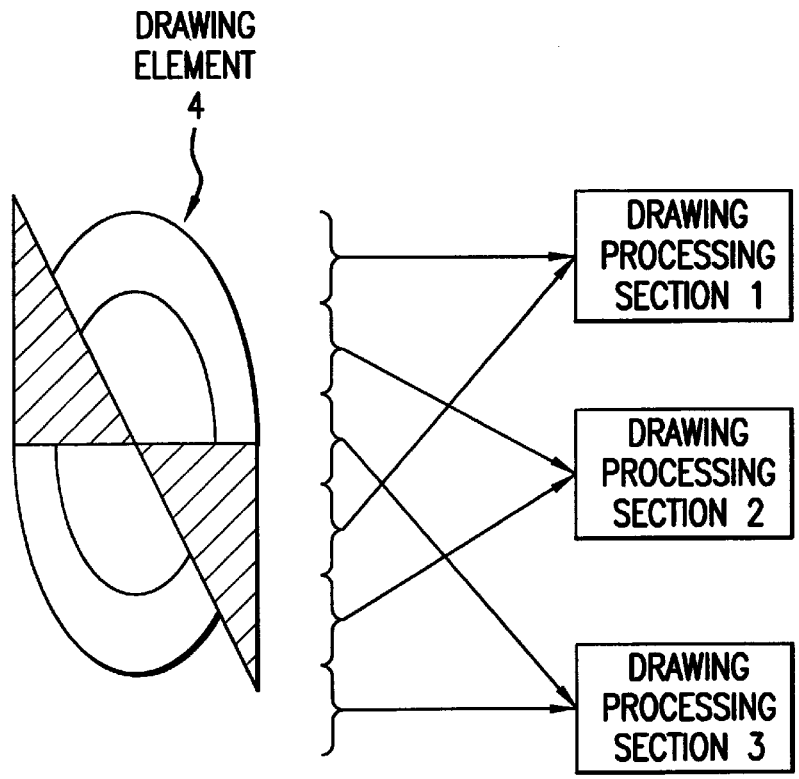
FIG. 1 is a conceptual diagram of parallel processing in equal splitting.
Figure 2:
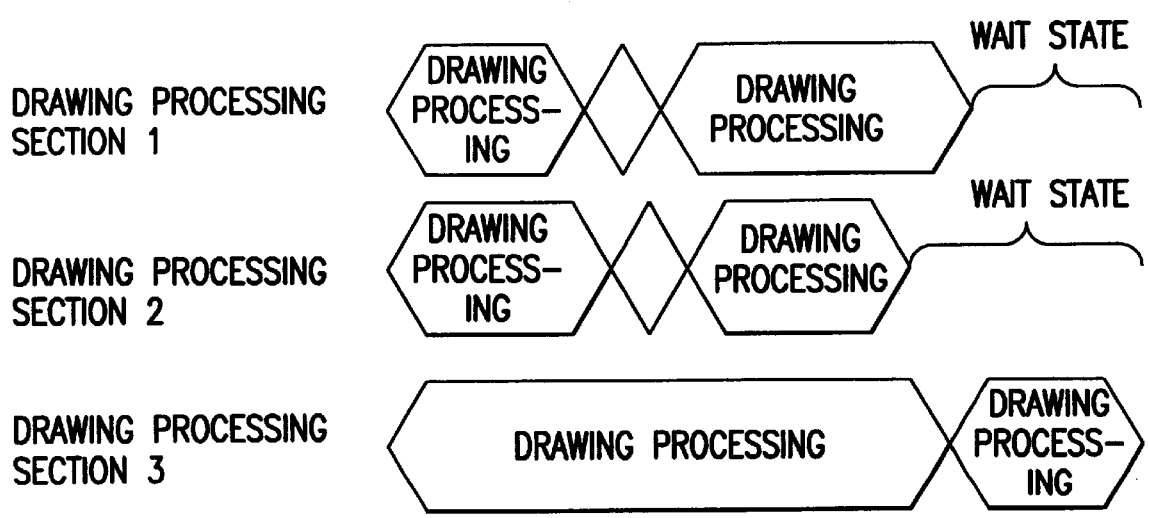
FIG. 2 is a timing chart explaining parallel processing in equal splitting.

10 Input means
11 Drawing data generating means
12 Load estimated value calculating means
13 Drawing data storage control means
14 Processing responsibility range assignment means
15 Drawing means
16 Processing result storage control means
100 Drawing processing apparatus
200 Output apparatus

DESCRIPTION OF THE PREFERRED EMBODIMENTS

Next, embodiments will be explained in more detail by using specific examples.

Embodiment 1

This embodiment assumes that the load estimated value calculating means 12 calculates a load estimated value using the number of pieces of drawing description data counted when generating drawing data.

Figure 19:
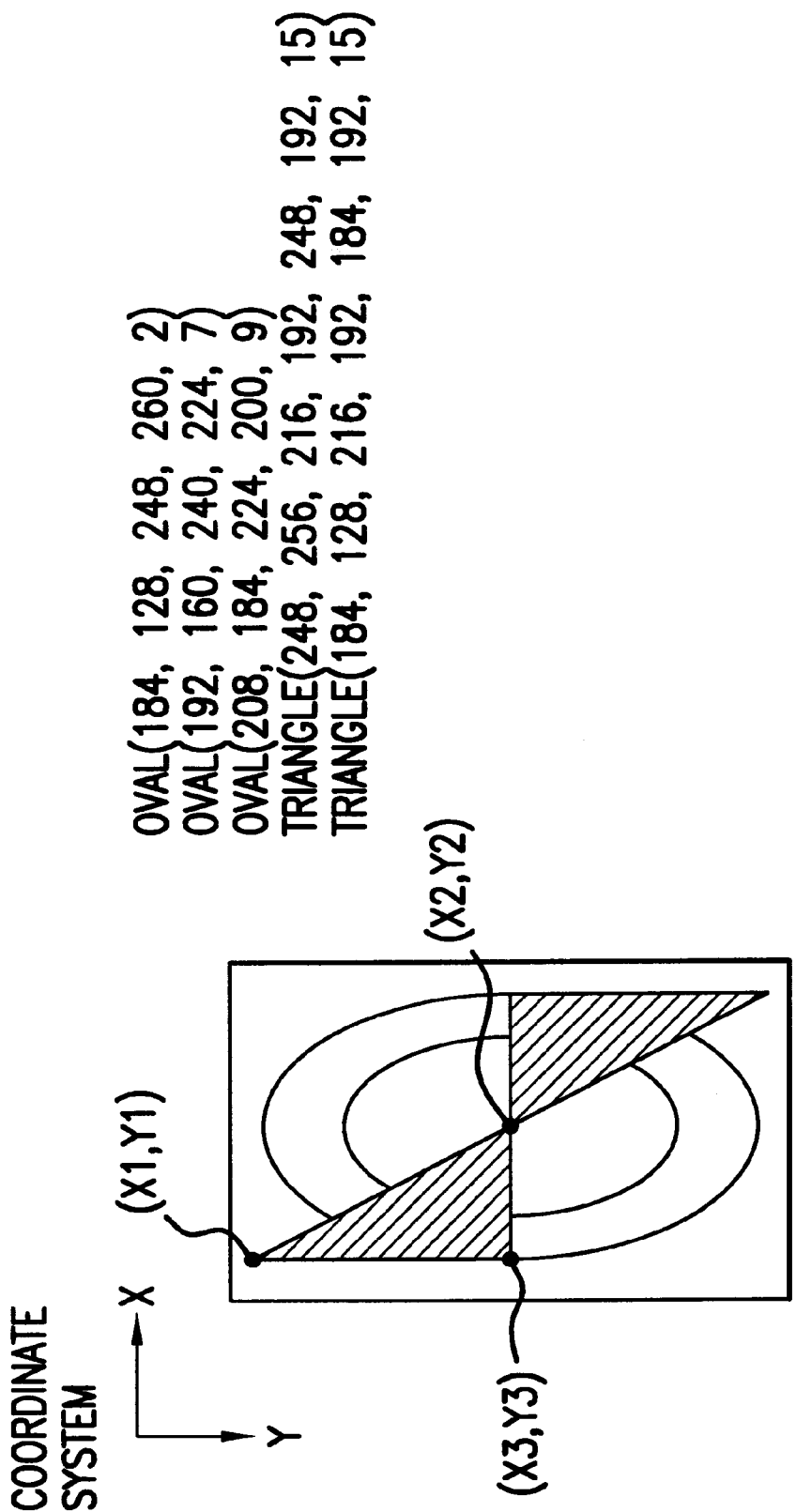
FIG. 19 shows input drawing description data and a drawing sample.

FIG. 19 shows input drawing description data and a conceptual diagram of a drawing sample represented by the input drawing description data. Subsequent explanation relates to an example of drawing processing when the input drawing description data is inputted. The drawing sample consists of three ovals and two triangles. The input drawing description data consists of oval description data "oval" and triangle description "triangle". For example, triangle (184, 128, 216, 192, 184, 192, 15) indicates that (X1, Y1)=(184, 128), (X2, Y2)=(216, 192), (X3, Y3)=(184, 192) and a hatching pattern is 15. Because others are also the same, explanation is omitted.

Figure 20:
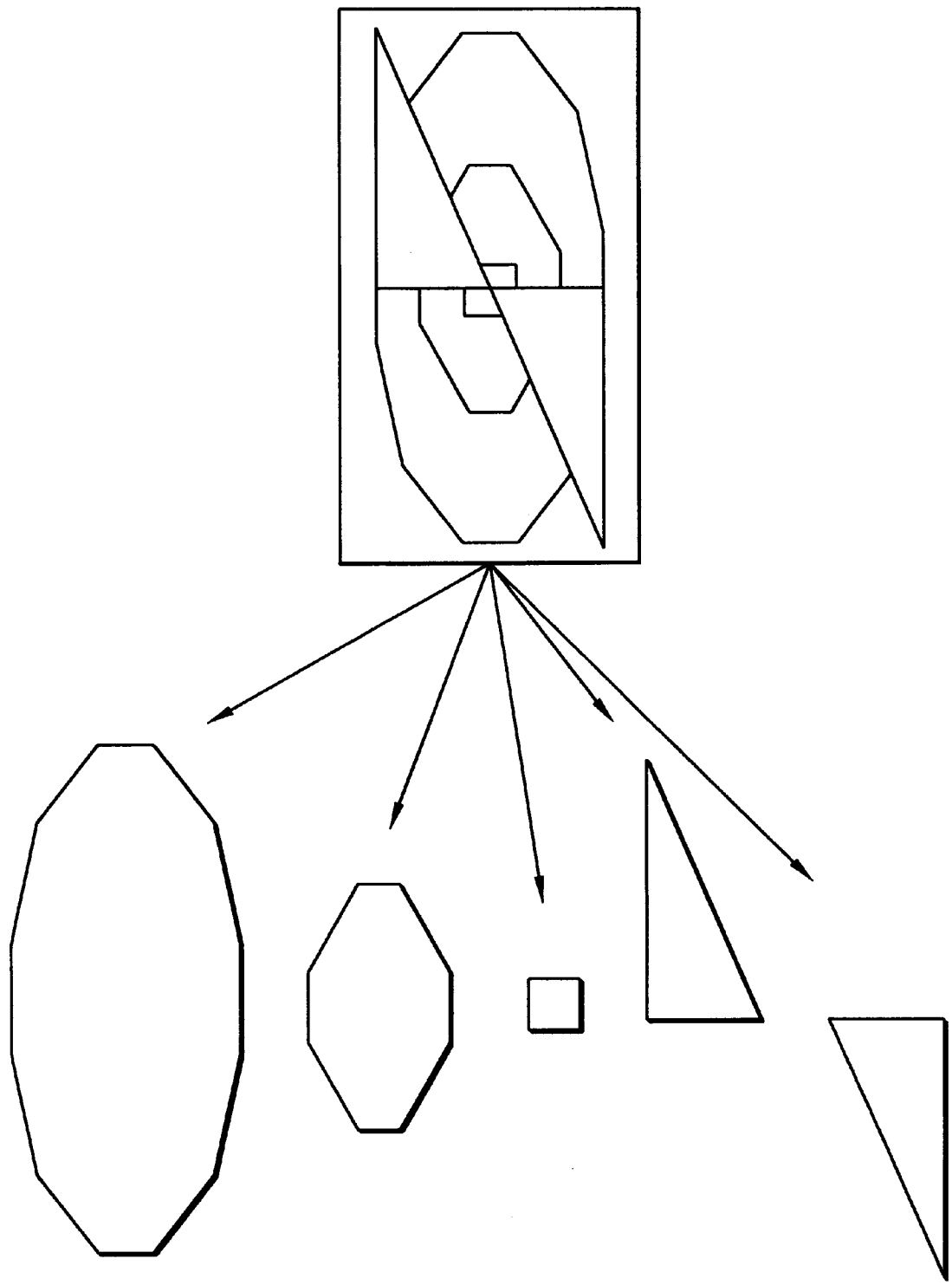
FIG. 20 is a conceptual diagram of drawing data.

FIG. 20 is a conceptual diagram of drawing data generated by the drawing data generating means 11 from the drawing description data inputted in FIG. 19. In this example, the respective objects of the drawing description data are converted into a form that represents drawing areas by vectors, and are sent to the drawing data storage control means 13.

Figure 11:
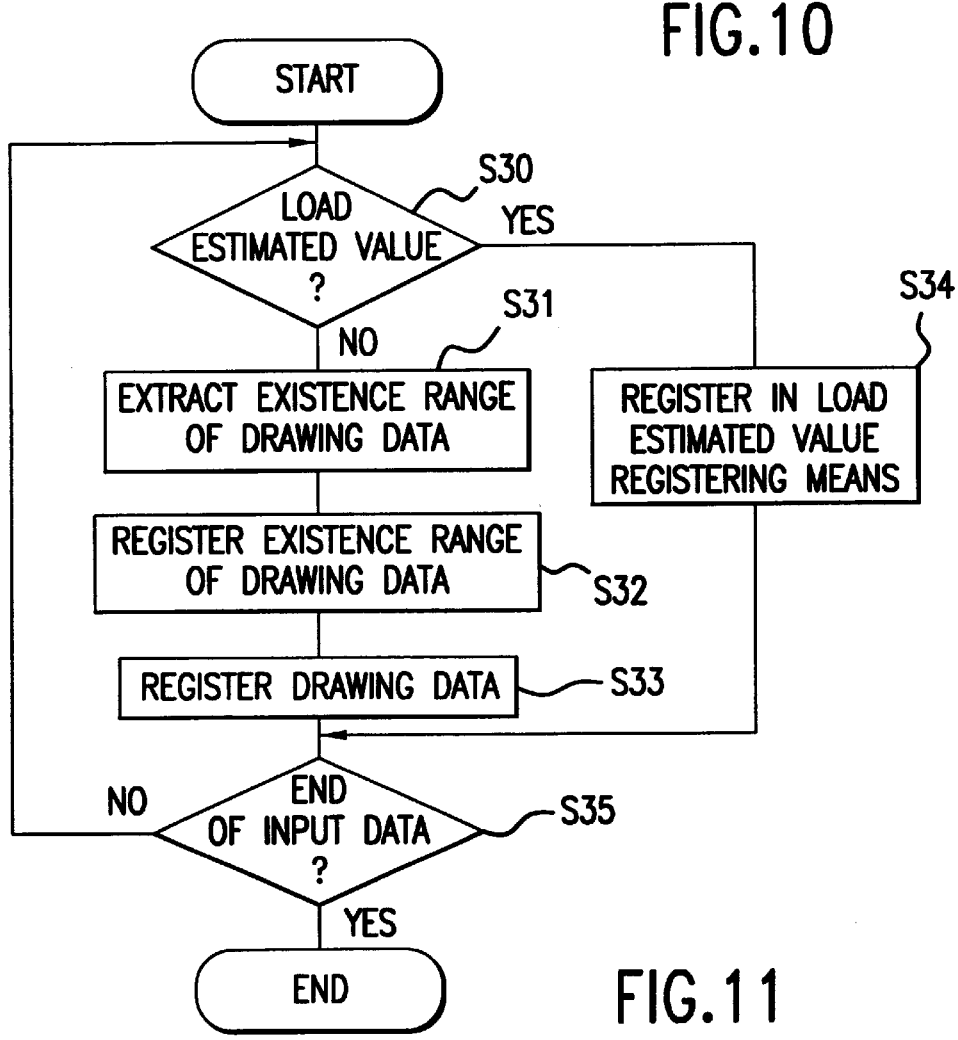
FIG. 11 is a flowchart showing the flow of data storage processing of the drawing data storage control means.
Figure 12:
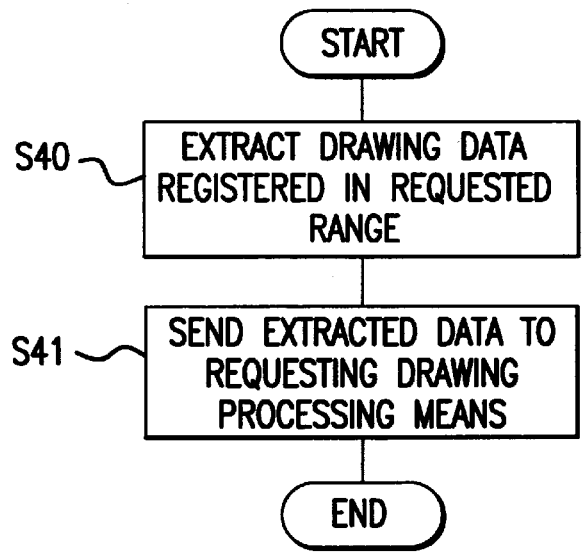
FIG. 12 is a flowchart showing the flow of data transmission processing of the drawing data storage control means.
Figure 13:
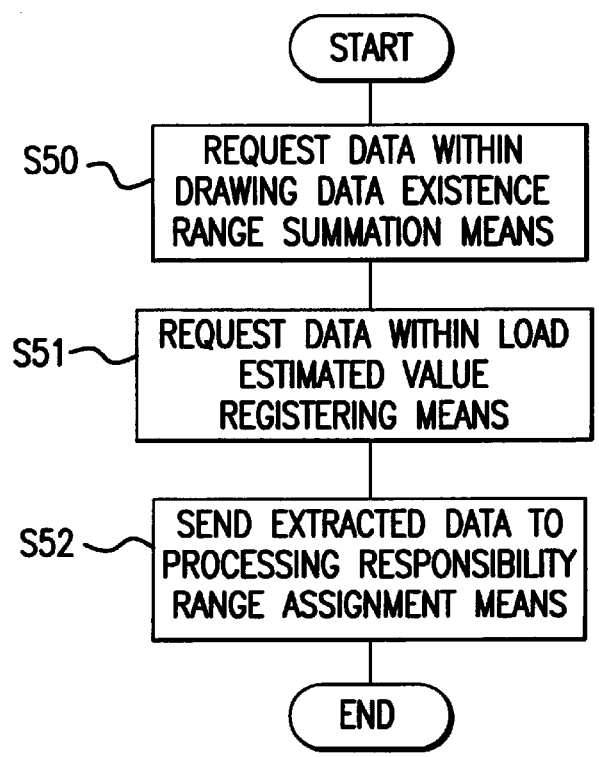
FIG. 13 is a flowchart showing the processing outline of the processing responsibility range assignment means.
Figure 21:
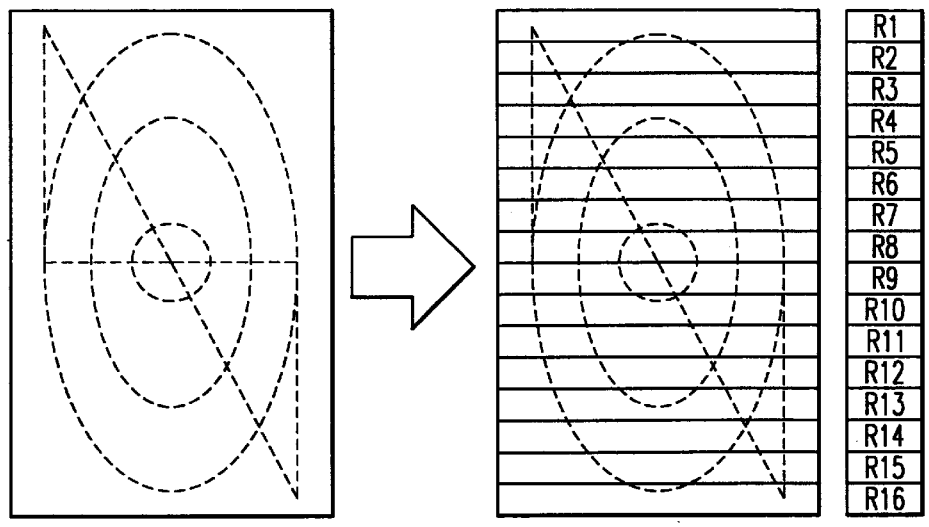
FIG. 21 shows an example of unit drawing areas.

FIG. 21 is a conceptual diagram showing an example of unit drawing areas. A drawing area is split into unit drawing areas on a scanning line basis. Drawing data is generated by the drawing data generating means 11 and is transferred to the drawing data storage control means 13. The drawing data transferred to the drawing data storage control means 13 is subjected to processing explained in FIG. 11 and is stored in the drawing data storage control means 13.

Figure 22:
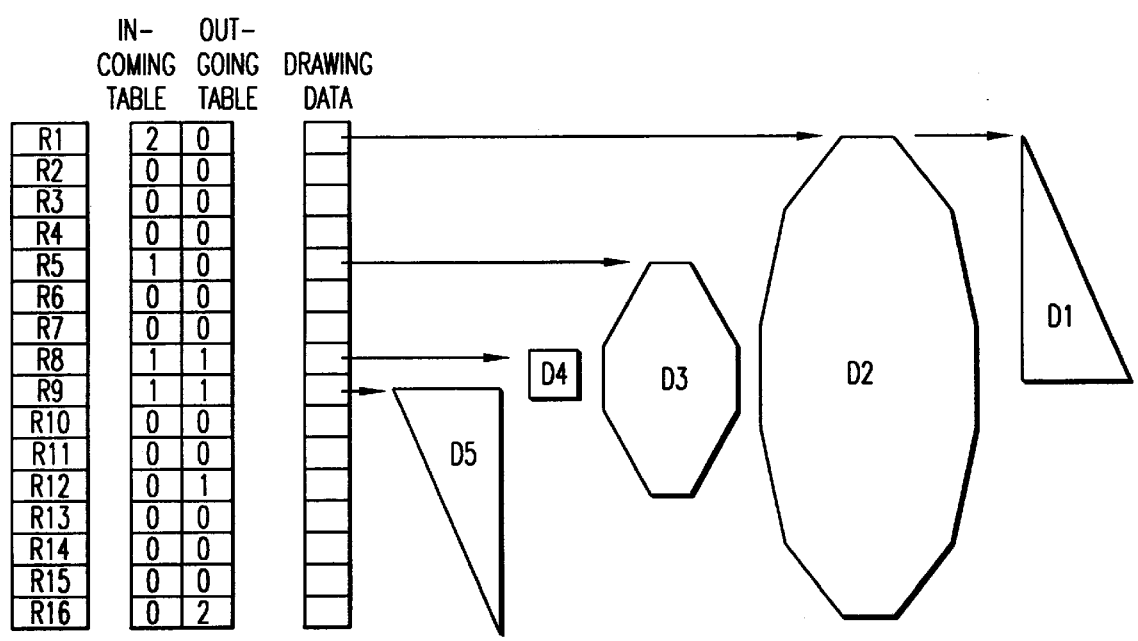
FIG. 22 shows an example of storing drawing data in the drawing data storage control means.

FIG. 22 shows the state in which drawing data is stored in the drawing data storage control means 13. The drawing data existence range summation means 134 explained in FIG. 9 has an incoming table and an outgoing table. The incoming table sums up the number of pieces of drawing data having the minimum (upper coordinate) of Y coordinate values in each unit drawing area. The outgoing table sums up the number of pieces of drawing data having the maximum (lower coordinate) of Y coordinate values in each unit drawing area.

Figure 9:
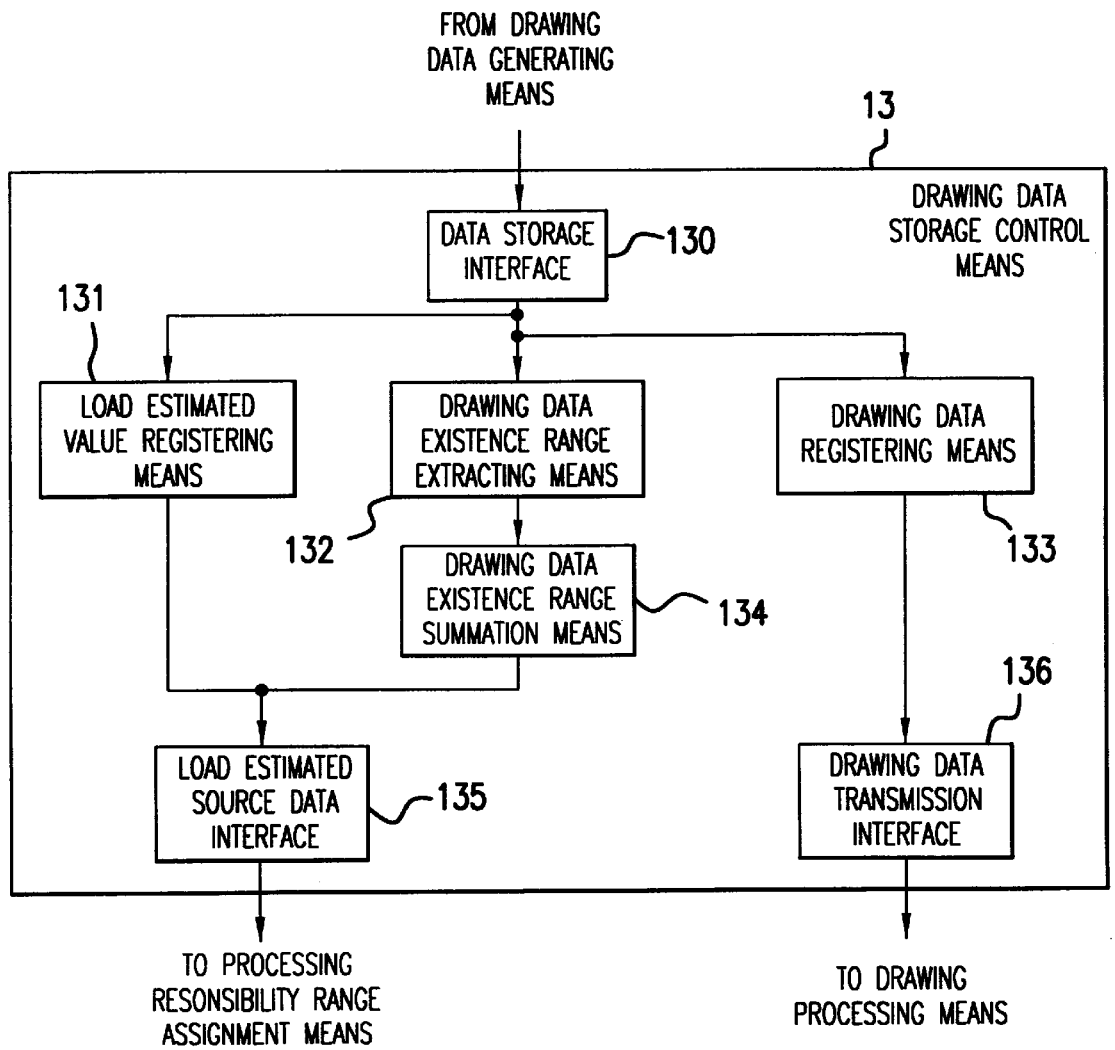
FIG. 9 shows the configuration of drawing data storage control means.
Figure 10:
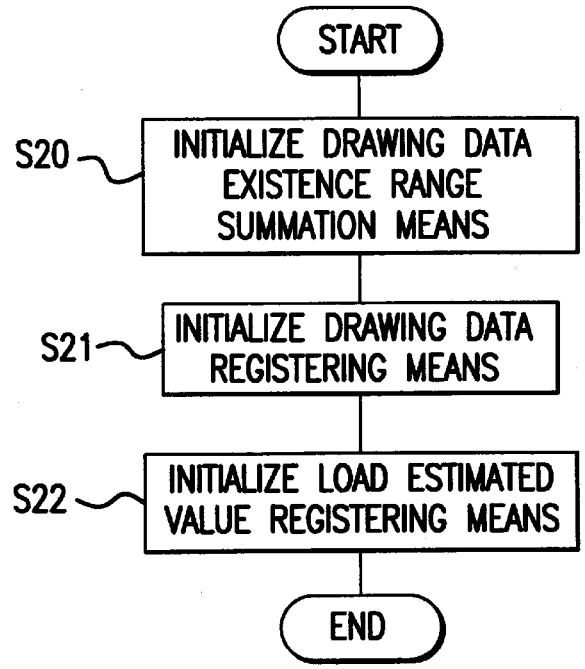
FIG. 10 is a flowchart showing the flow of initialization processing of the drawing data storage control means.

The drawing data registering means 133 explained in FIG. 9 comprises a table having entries for each unit drawing area; each piece of drawing data is stored in association with the position of an entry corresponding to its minimum Y coordinate value.

In this embodiment, since a load estimated value in a unit area can be calculated using an incoming table and an outgoing table, the explanation of registration of load estimated values is omitted.

The following explanation assumes that drawing processing is performed by three drawing processing means 15.

When drawing data is stored in the drawing data storage control means 13, a start command is issued to the drawing processing means 15. Although the drawing processing means 15 are started at almost the same time, the order they are started is established at this stage because access to the processing responsibility range assignment means 14 is exclusively controlled.

Herein, it is assumed that the first access to the processing responsibility range assignment means 14 is permitted in the order of drawing processing means A, drawing processing means B, and drawing processing means C.

First, an inquiry is made to the drawing data storage control means 13 and an incoming table and an outgoing table are obtained as load estimated source data. Next, unit load estimated values are calculated sequentially from a unit drawing area R1 and a split load estimated value in all unit areas is calculated.

In the case of this embodiment, since a unit load estimated value is the number of drawing objects existing in a unit drawing area, it is obtained by the sum of a unit load estimated value left in a previous unit area and the current number in the incoming table. That is, the following formula is established.

[Formula 1]

Unit load estimated value=a load estimated value taken over from the immediately preceding unit area+the value of the incoming table in a current unit area A load estimated value taken over from the immediately preceding unit area, which is the number of drawing objects left in a previous unit area, can be obtained by subtracting the number of objects terminated in the first preceding unit drawing area, that is, a value in the outgoing table, from the immediately preceding unit load estimated value.

[Formula 2]

A load estimated value taken over from the immediately preceding unit area =the immediately preceding unit load estimated value−a value of the outgoing table in the immediately preceding unit drawing area A split load estimated value is obtained by adding load estimated values in the unit drawing areas. That is, a split load estimated value is found by the following formula.

[Formula 3]

Figure 23:
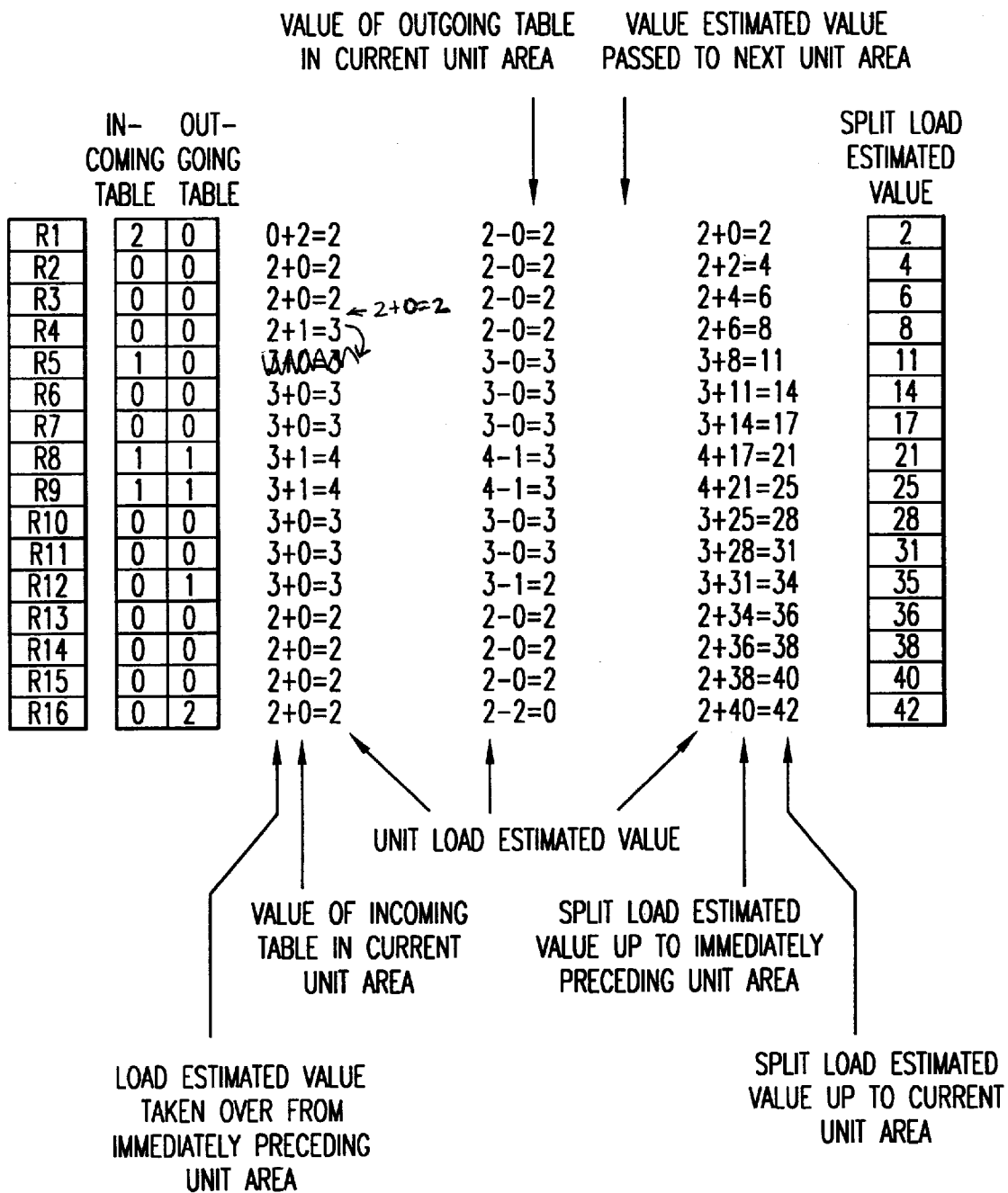
FIG. 23 shows an example of calculating split load estimated values.

A split load estimated value=unit load estimated value+a split load estimated value for previous unit areas FIG. 23 shows the result of calculating unit load estimated values, load estimated values taken over to the next unit area, and split load estimated values. It is apparent from FIG. 23 that the sum of unit load estimated values in the drawing area is 42 because it is a split load estimated value for the last unit drawing area.

Accordingly, to equally assign a load to all drawing processing means 15, divide the sum (42) of unit load estimated values by the number (3) of processing area processing means. That is, if one drawing processing means takes responsibility for a load of 14 (=42÷3), processing can be performed equally.

Upon receipt of an inquiry from the drawing processing means A, the processing responsibility range assignment means 14 checks split load estimated values sequentially from the first unit drawing area R1 and extends a distributed drawing area.

Herein, a reference value for splitting an area is 14 as calculated previously. As apparent from FIG. 23, since a split load estimated value in a unit area R6 is 14, the processing responsibility range assignment means 14 assigns a range from R1 to R6 to the drawing processing means A. Processing for a request from the next drawing processing means B is performed. The unprocessed position holding means 143 explained in FIG. 14 is set to a unit drawing area R7 and a split load estimated value 14 for the unit drawing area R6 and preceding unit drawing areas which are already assigned is set in the load estimated source data holding means 145 explained in FIG. 14.

Figure 24:
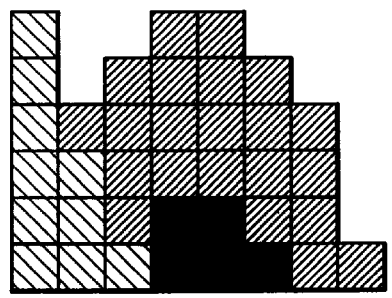
FIG. 24 shows an example 1 of split output of a drawing sample.

Upon receipt of a processing responsibility range, the drawing processing means A reads drawing data from the drawing data storage control means 13 and sequentially processes it. Drawing data read herein to be subjected to drawing processing is D1, D2, and D3, which have minimum values (upper coordinate values) of Y direction between unit drawing areas R1 and R6 and do not have maximum values (lower coordinate values) of Y direction above the unit drawing area R1. The drawing processing means A processes this drawing data, creates processing result data corresponding to the unit drawing areas R1 through R6, and stores it in the processing result storage control means 16. The result of processing by the drawing processing means A is shown in FIG. 24.

The drawing processing means A requests again the processing responsibility range assignment means 14 to assign a processing responsibility range and continues processing.

Figure 14:
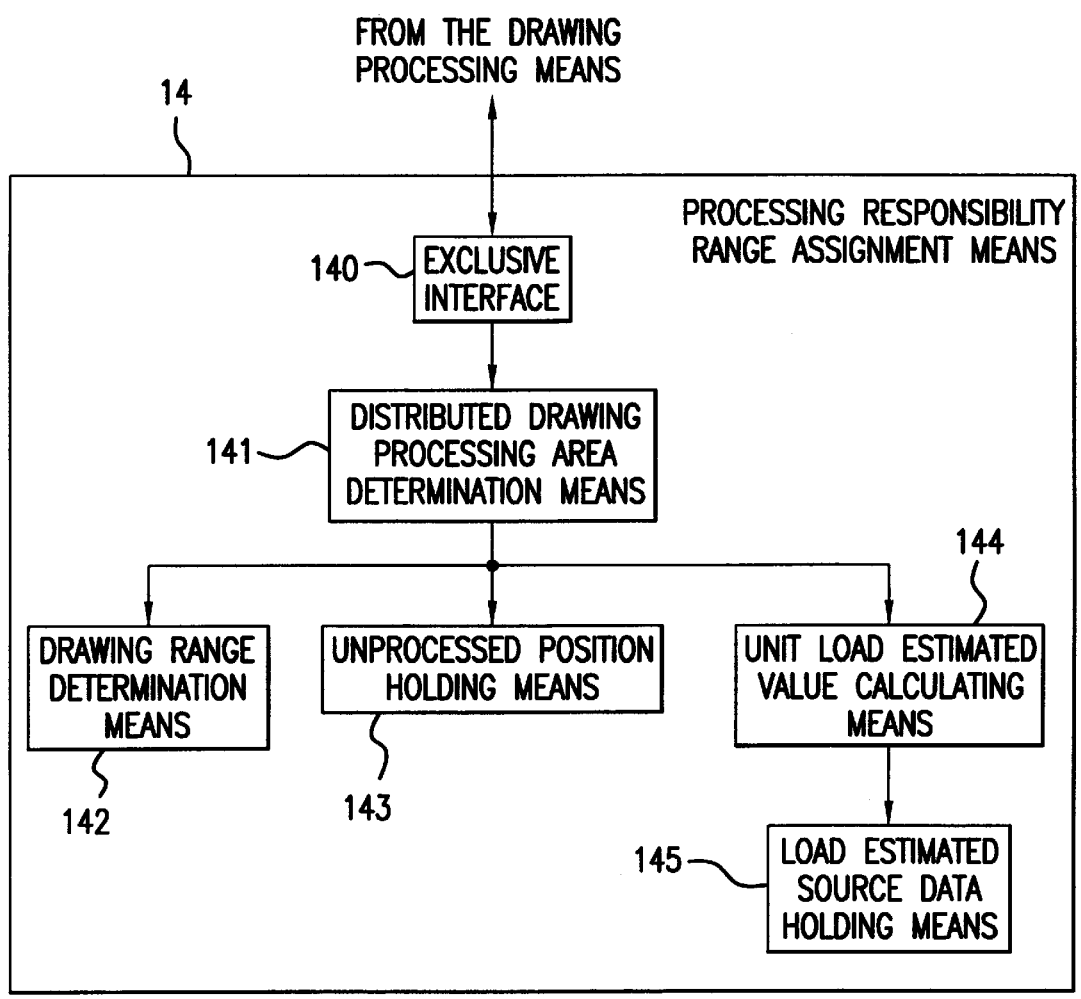
FIG. 14 shows the configuration of the processing responsibility range assignment means.
Figure 15:
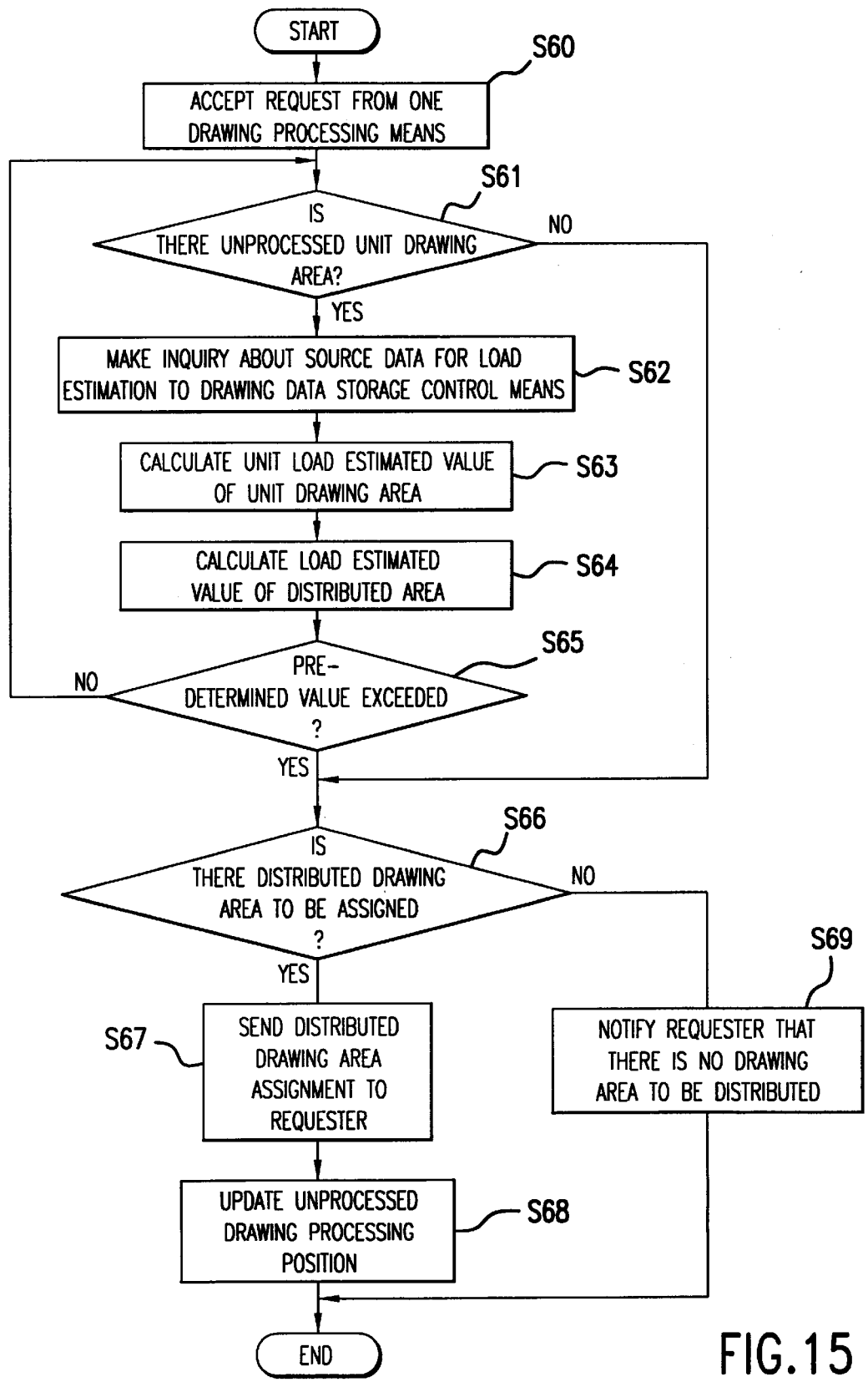
FIG. 15 is a flowchart showing the flow of processing of the processing responsibility range assignment means.
Figure 16:
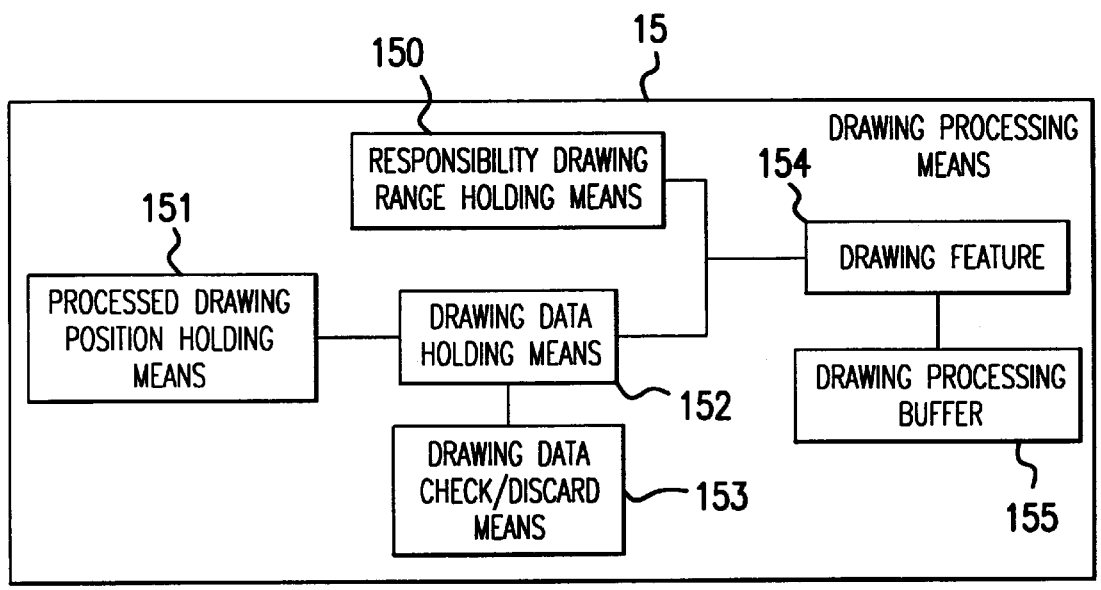
FIG. 16 shows the configuration of the drawing processing means.

Next, upon receipt of an inquiry from the drawing processing means B, the processing responsibility range assignment means 14 extends the distributed drawing area sequentially from a unit drawing area R7 held in the unprocessed position holding means 143 explained in FIG. 14.

A range is determined at the point where a value resulting from subtracting a distributed load estimated value for unit drawing areas already assigned, held in the load estimated source data holding means 145, from a split load estimated value for unit drawing areas sequentially extended reaches a reference value for splitting.

A value held by the load estimated source data holding means 145 is 14. As apparent from FIG. 23, the reference value 14 is reached when the distributed drawing area has been extended to the unit drawing area R10 (a split load estimated value in the unit drawing area R10 is 28). The processing responsibility range assignment means 14 assigns the range from R7 to R10 to the drawing processing means B, and proceeds to processing of a request from the next drawing processing means C. The unprocessed position holding means 143 is set to a unit drawing area R11, and a split load estimated value 28 for the unit drawing area R10 and preceding drawing areas which are already assigned is set in the load estimated source data holding means 145.

Figure 17:
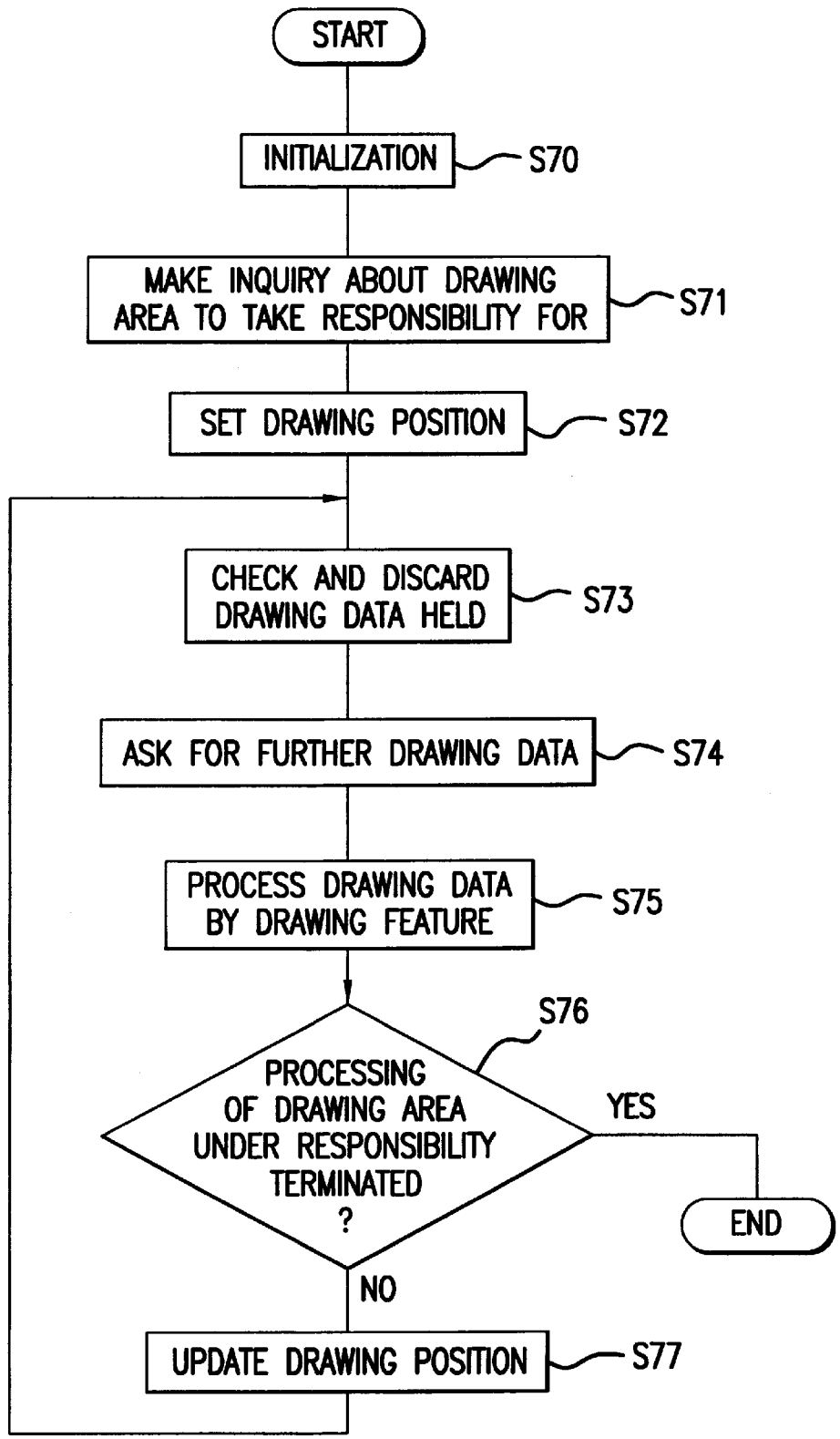
FIG. 17 is a flowchart showing the flow of processing of the drawing processing means.
Figure 18:
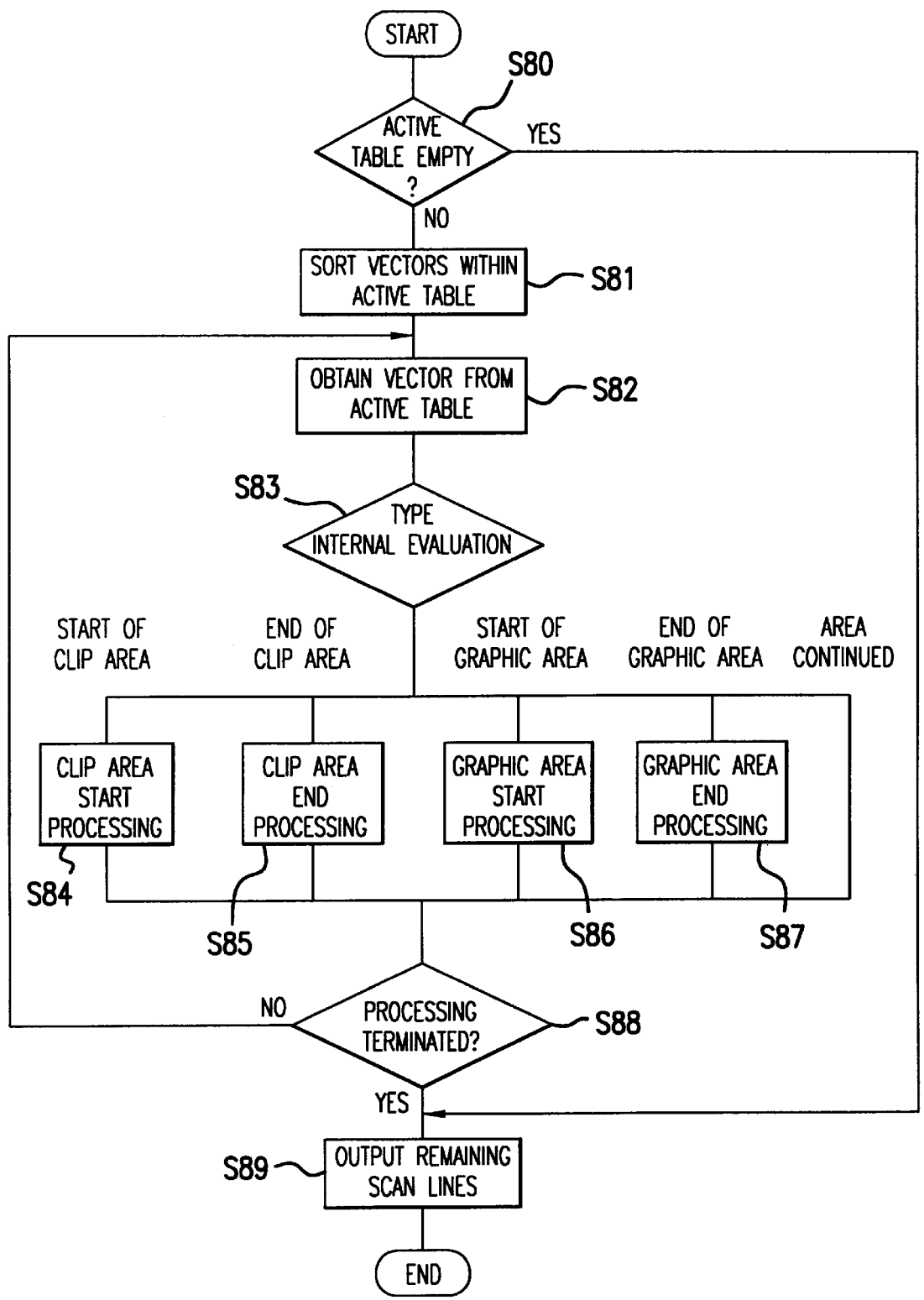
FIG. 18 is a flowchart showing the flow of processing of the drawing feature.
Figure 25:
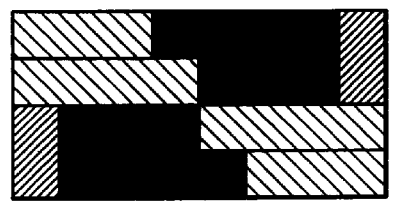
FIG. 25 shows an example 2 of split output of a drawing sample.

Upon receipt of a processing responsibility range, the drawing processing means B reads drawing data from the drawing data storage control means 13 and sequentially processes it. Since the processed drawing position holding means 151 explained in FIG. 17 remains initialized, the drawing processing means B requests drawing data from the unit drawing area R1, not from the unit drawing area R7. D1, D2, D3, D4, and D5 are read as drawing data having minimum values (upper coordinate values) of Y direction in the unit drawing area R10 and preceding drawing areas, and not having maximum values (lower coordinate values) of Y direction above the unit drawing area R6. The drawing processing means B processes these drawing data, creates processing result data corresponding to the unit drawing areas R7 to R10, and registers it in the processing result storage control means 16. The result of processing by the drawing processing means B is shown in FIG. 25.

The drawing processing means B requests again the processing responsibility range assignment means 14 to assign a processing responsibility range and continues processing.

Next, upon receipt of an inquiry from the drawing processing means C, the processing responsibility range assignment means 14 extends the distributed drawing area sequentially from a unit drawing area R11 held in the unprocessed position holding means 143 explained in FIG. 14. Thereafter, in the same way as in the drawing processing means B, a value held by the load estimated source data holding means 145 is 28 and the reference value 14 is reached when the distributed drawing area has been extended to a unit drawing area R16 (a split load estimated value in a unit drawing area R16 is 42). The processing responsibility range assignment means 14 assigns the range from R11 to R16 to the drawing processing means C, and proceeds to processing of a request from the next drawing processing means. However, since all unit drawing areas have been assigned, the unprocessed position holding means 143 is flagged to indicate that there has been no unprocessed position.

Figure 26:
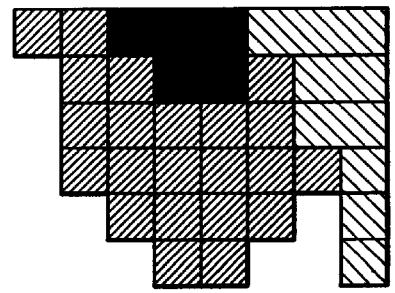
FIG. 26 shows an example 3 of split output of a drawing sample.

Since the processed drawing position holding means 151 remains initialized, the drawing processing means C requests drawing data from the unit drawing area R1, not from the unit drawing area R11. D2, D3, and D5 are read as drawing data having minimum values (upper coordinate values) of Y direction in the unit drawing area R16 and preceding drawing areas, and not having maximum values (lower coordinate values) of Y direction above the unit drawing area R10. The drawing processing means C processes these drawing data, creates processing result data corresponding to the unit drawing areas R11 to R16, and registers it in the processing result storage control means 16. The result of processing by the drawing processing means C is shown in FIG. 26.

The drawing processing means C requests again the processing responsibility range assignment means 14 to assign a processing responsibility range, but since all processing areas have been processed, processing is terminated. Other drawing processing means also terminate without being assigned areas again because they already terminate all drawing processing at termination of assignment to the drawing processing means C.

As described above, processing is started at almost the same time, the load estimated values of the drawing processing means are equally assigned, and processing terminates at almost the same time.

Embodiment 2

In the embodiment 1, a method for processing loads equally by using the load estimated value calculating means 12 was explained. That is, if a unit load estimated value is found, loads can be equalized according to the same processing as in the embodiment 1. In this embodiment and subsequent embodiments, how a unit load estimated value is estimated by the load estimated value calculating means 12 is explained.

In the embodiment 2, the load estimated value calculating means 12 projects an existence range of drawing data onto an axis used to assign processing by the processing responsibility range assignment means 14 and a load estimated value is calculated using the number of pieces of drawing data projected onto the axis.

FIG. 27 explains the concept of load estimation in this embodiment. The axis at the left of the figure is used to assign processing by the processing responsibility range assignment means 14. The existence range of each piece of drawing data is projected on the axis and the number of pieces of drawing data is accumulated. An accumulation result is shown in the lower portion of FIG. 27. As apparent from the figure, the drawing data is the most concentrated around the center of the drawing range.

Figure 28:
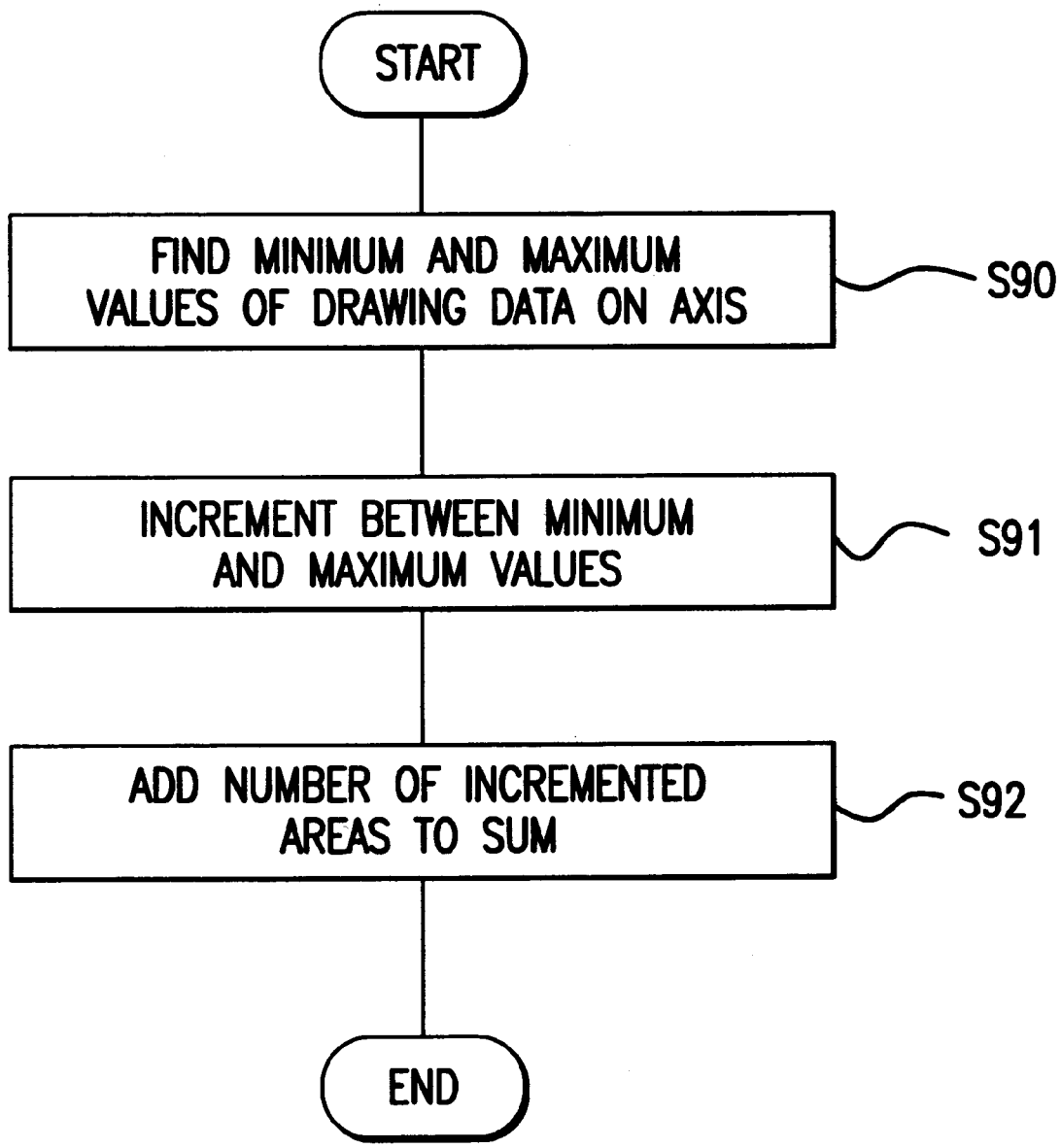
FIG. 28 is a flowchart of load estimated value creating processing.

FIG. 28 is a flowchart explaining the flow of processing to create a load estimated value after receiving drawing data from the drawing data generating means. In this case, a unit load estimated value is also explained using a tabular data structure. A work area for calculating the sum of all loads is also used.

In FIG. 28, when drawing data is received, a minimum value and a maximum value on an axis (Y axis in this case) used by the processing responsibility range assignment means to assign processing are calculated (S90). Next, numeric values between the minimum and maximum values are incremented in a unit load estimated value table. The number of incremented unit areas is added to a load sum value (S92).

Figure 29:
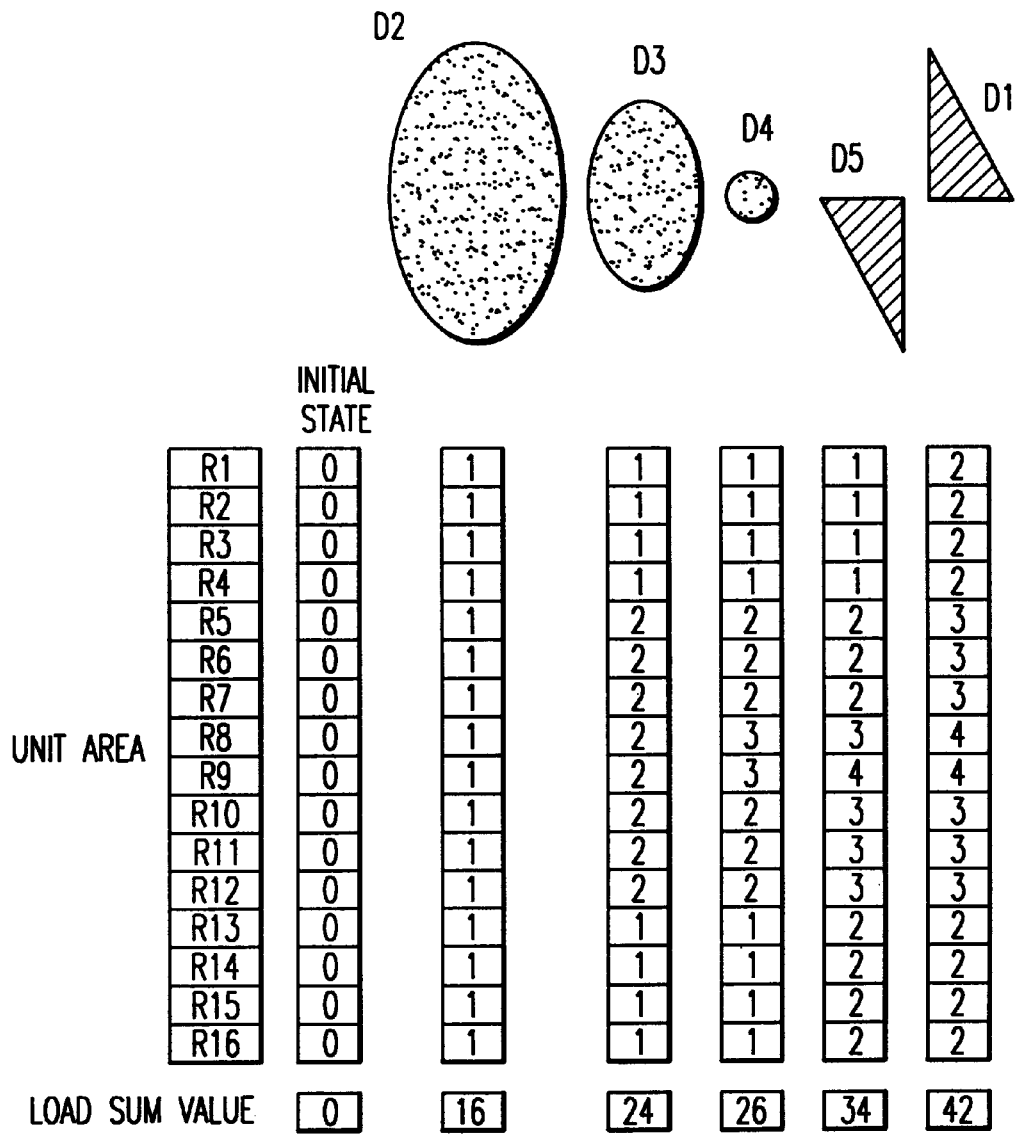
FIG. 29 shows changes of values of a unit load estimated value table.

FIG. 29 shows changes of values of the unit load estimated value table immediately after individual pieces of drawing data have been inputted. At an initial state, all unit areas and the load sum value of all unit areas are initialized to 0. When the first drawing data D2 is inputted, the minimum value R1 and maximum value R16 on Y axis are obtained. Numeric values are incremented for each of unit areas R1 to R16. As a result, all unit load estimated values corresponding to D2 become 1. 16, which is the number of unit areas R1 to R16, is added to the load sum value, so that 16 is obtained as a current load sum value.

Next, when drawing data D3 is inputted, a minimum value R5 and a maximum value R12 are obtained. Numeric values are incremented for each of unit areas R5 to R12. As a result, all unit load estimated values corresponding to D3 become 2. 8, which is the number of unit areas R5 to R12, is added to a load sum value, so that 24 is obtained as a current load sum value.

Thereafter, similarly, when all pieces D4, D5, and D1 of drawing data are inputted, unit load estimated values in unit areas R1 to R4 are 2, unit load estimated values in unit areas R5 to R7 are 3, unit load estimated values in unit areas R8 and R9 are 4, unit load estimated values in unit areas R10 to R12 are 3, and unit load estimated values in unit areas R13 to R16 are 2. The load sum value is 42.

Using the unit load estimated value table and the load sum value, the processing responsibility range assignment means 14 divides the total number 42 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

Figure 30:
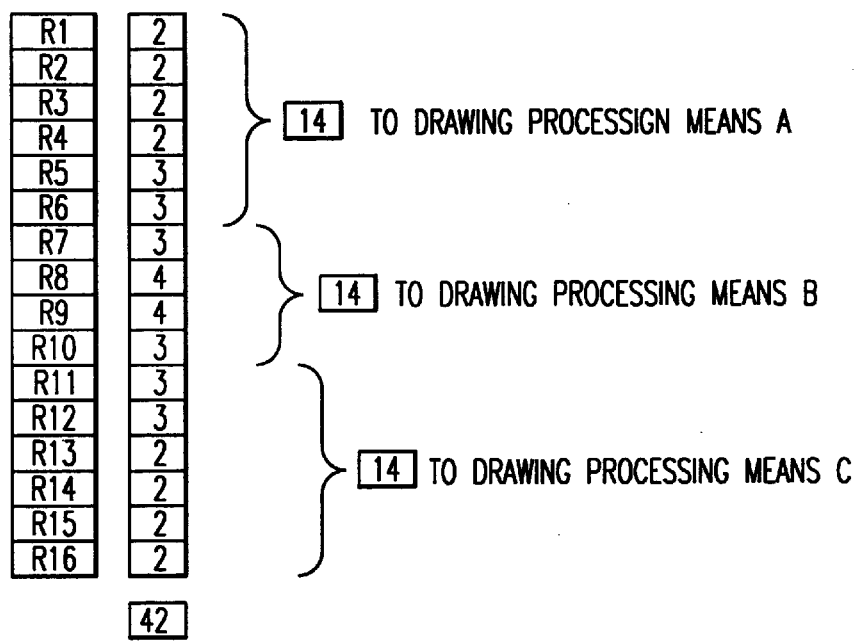
FIG. 30 shows an example of the result of splitting and processing assignment.

If the number of drawing processing means 15 is three, a load quantity assigned to one drawing processing means 15 is 14. The result of assignment of a responsibility range to each drawing processing means 15 by the processing responsibility range assignment means 14 is shown in FIG. 30. As a result, a range from R1 to R6 is assigned to the drawing processing means A, a range from R7 to R10 is assigned to the drawing processing means B, and a range from R11 to R16 is assigned to the drawing processing means C.

As described above, by equally assigning the number of pieces of drawing data projected onto a processing assignment axis to each drawing processing means 15, loads can be equalized.

Although a single load estimated value table is used herein to simplify explanation, unit load estimated values can be calculated using the same incoming table and outgoing table as in the embodiment 1.

As explained in this embodiment, if graphic data is of a format that allows the maximum and minimum values indicating the existence range of the graphic to be extracted from the graphic data, it is apparent that the same effect can be obtained regardless of the representation format of the graphic.

Embodiment 3

Figure 31:
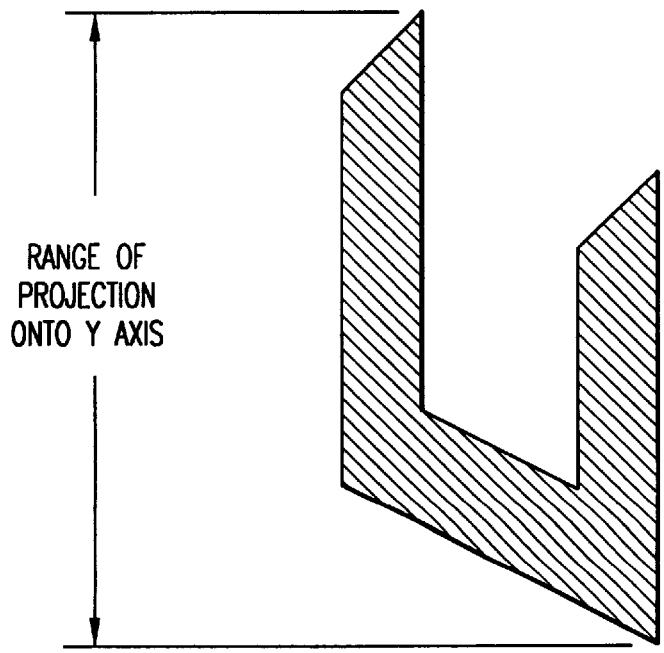
FIG. 31 shows a sample of a drawing graphic.

Although, in the embodiments 1 and 2, any format of graphic data is permitted if the maximum and minimum values of the existence range of the graphic are obtained, the load of a concave graphic as shown in FIG. 31 was impossible to be represented correctly. Accordingly, in this embodiment, the load estimated value calculating means 12 calculates load estimated values by using the graphic data represented in vector form, explained in FIG. 6.

Figure 6:
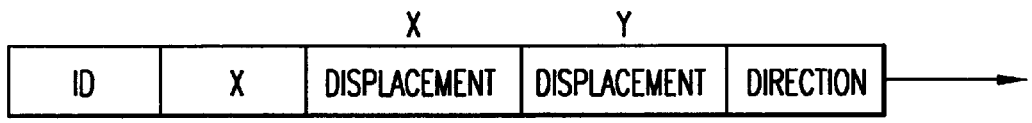
FIG. 6 explains a vector form.
Figure 7:
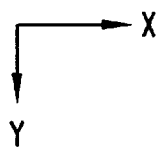
FIG. 7 explains examples of vectors.
Figure 8:
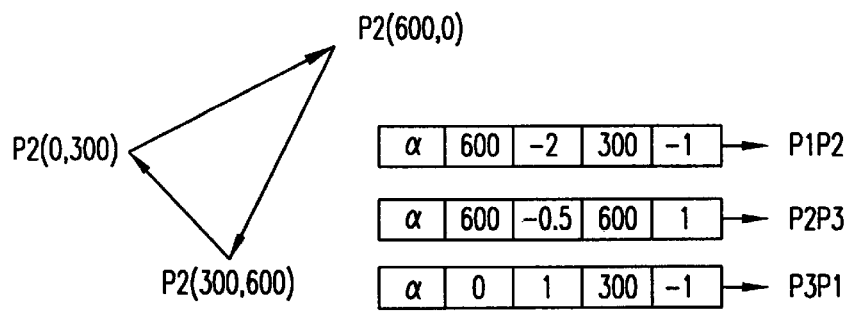
FIG. 8 shows an example of representing a graphic by vectors.
Figures 32, 33:
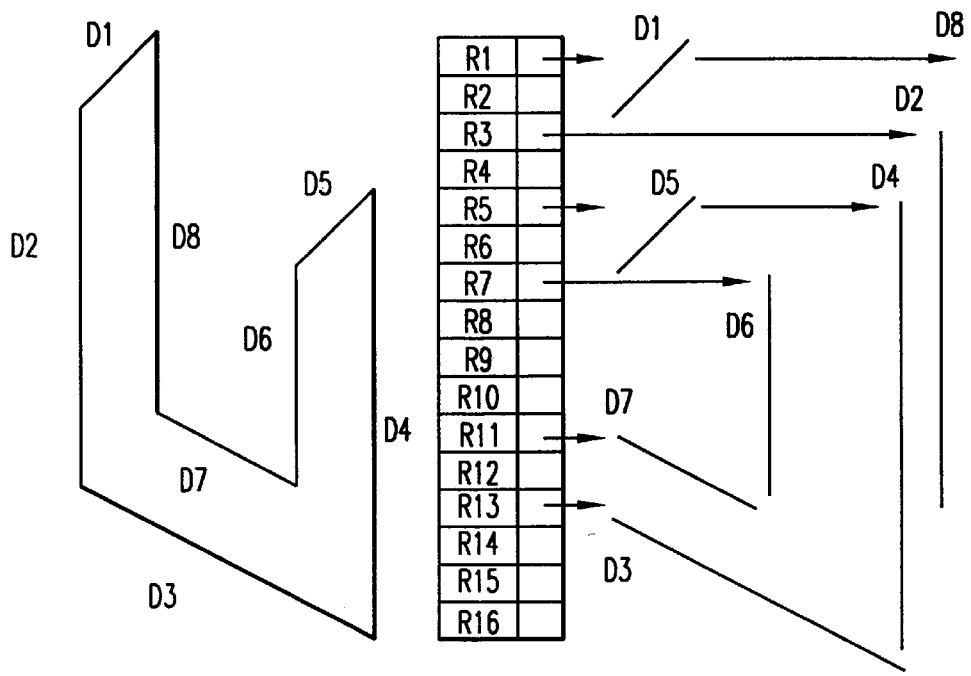
FIG. 32 shows an example of registration of vector data in the drawing data storage control means.
FIG. 33 shows changes of values of a unit load estimated value table.

FIG. 32 is a conceptual diagram of generation of graphic data of vector form explained in FIG. 6 for the graphic shown in FIG. 31. As shown in FIG. 32, the graphic shown in FIG. 31 is comprised of eight vectors D1 to D8. The right side of FIG. 32 shows the state in which generated drawing data is registered in the drawing data storage control means. The areas R1 to R16 are unit drawing areas and individual pieces of the drawing data are stored in association with the unit drawing areas containing their starting point.

Next, a method for generating load estimated values from the drawing data will be explained. The method for generating load estimated values is made according to the flowchart explained in FIG. 28. First, when drawing data is generated, the minimum and maximum values on an axis (Y axis in this case) used to assign processing by the processing responsibility range assignment means are calculated (S90). Next, numeric values between the minimum and maximum values of the unit load estimated value table are incremented (S91). The number of incremented unit areas is added to the load sum value (S92).

FIG. 33 shows changes of values of the unit load estimated value table immediately after individual pieces of the drawing data have been inputted. At an initial state, all unit areas and the load sum value of all unit areas are initialized to 0. When the first drawing data D1 is inputted, the minimum value R1 and maximum value R2 on the Y axis are obtained. Numeric values are incremented for each of unit areas R1 and R2. As a result, all unit load estimated values corresponding to D1 become 1. The number of unit areas R1 and R2, 2, is added to the load sum value, so that 2 is obtained as a current load sum value.

Next, when drawing data D2 is inputted, a minimum value R3 and a maximum value R12 are obtained. Numeric values are incremented for each of unit areas R3 and R12. As a result, all unit load estimated values corresponding to D2 become 1. The number of unit areas R3 to R12, 10, is added to the load sum value, so that 12 is obtained as a current load sum value.

Thereafter, in the same manner, when all pieces D3 to D8 of drawing data are inputted, the unit load estimated value of unit areas R1 to R4 is 2, the unit load estimated value of unit areas R5 to R12 is 4, and the unit load estimated value of unit areas R13 to R16 is 2. The load sum value is 48.

Using the unit load estimated value table and the load sum value, the processing responsibility range assignment means 14 divides the total number 48 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

Figure 34:
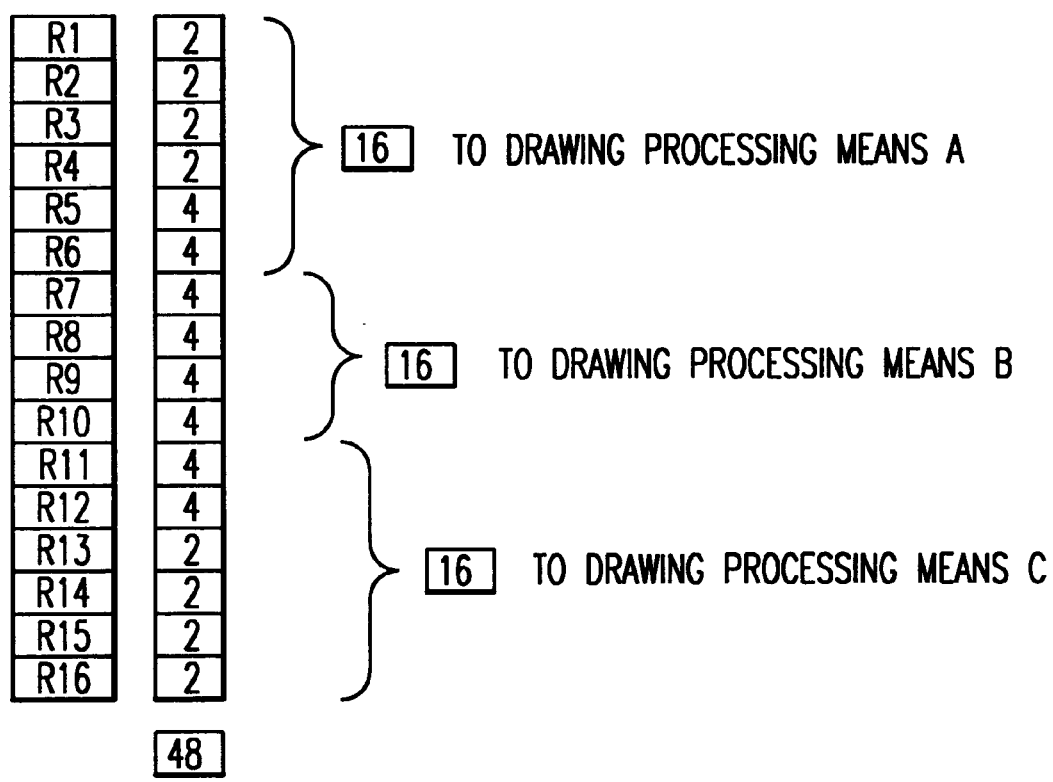
FIG. 34 shows an example of the result of splitting and processing assignment.

If the number of drawing processing means 15 is three, a load quantity assigned to one drawing processing means 15 is 16. The result of assignment of a responsibility range to each drawing processing means 15 by the processing responsibility range assignment means 14 is shown in FIG. 34. As a result, a range from R1 to R6 is assigned to the drawing processing means A, a range from R7 to R10 is assigned to the drawing processing means B, and a range from R11 to R16 is assigned to the drawing processing means C.

By representing graphic data in vector form as described above, loads can be represented correctly even when concave graphics are inputted.

Although a single load estimated value table is used in this embodiment to simplify explanation, unit load estimated values can be calculated using the same incoming and outgoing tables as in the embodiment 1. Although explanation has been made using one graphic, it goes without saying that loads can be represented correctly regardless of the number of graphics as long as a plurality of graphics are represented in the same graphic data format.

Embodiment 4

In the embodiment 3, the loads of a concave graphic can be represented correctly by using vector form as graphic data. In the embodiment 4, the load estimated value calculating means 12 calculates load estimated values by using graphic data in trapezoid-split form, explained in FIG. 35.

FIG. 35 shows data representing a drawing area by trapezoidal representation having two sides parallel to a scanning line direction and its data structure. Positions in a drawing area are represented in the XY coordinate system with a Y coordinate axis taken in a subscanning direction and an X coordinate axis in a scanning direction.

Except for values (YMIN, YMAX, X1, X2, DX1, and DX2) concerning a drawing area of data structure, a painting attribute value (ATTR) such as colors, a painting priority value (PRIO) for controlling an overlapping order, and other information are stored. A painting area is represented in various ways by trapezoid data; herein, one example is shown. In the figure, a trapezoidal area can be at least defined by the maximum YMAX and minimum YMIN of Y coordinate values, an X coordinate value X1 at the minimum of Y coordinate and an increment DX1 of X coordinate values at an increase of Y coordinate values by a unit quantity on the left side, and an X coordinate value X2 at the minimum of Y coordinate and an increment DX2 of X coordinate values at an increase of Y coordinate values by a unit quantity on the right side.

Figure 36:
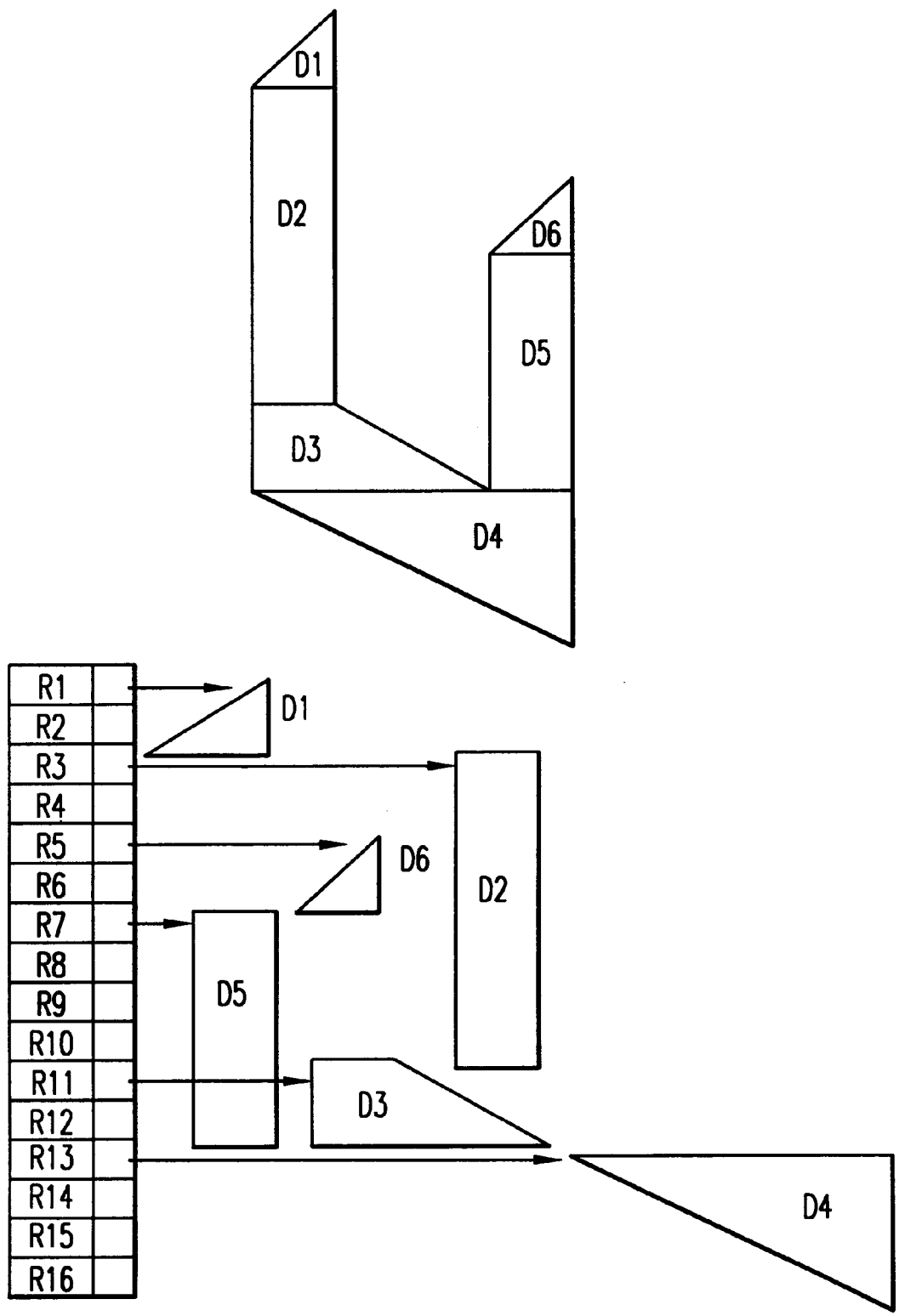
FIG. 36 shows an example of registration of trapezoid-split data in the drawing data storage control means.

FIG. 36 is a conceptual diagram for the generation of graphic data of the graphic in FIG. 31 by the trapezoidal representation explained in FIG. 35. As shown in FIG. 36, the graphic shown in FIG. 31 is composed of six trapezoids D1 to D6. The lower side of FIG. 36 shows the state in which generated drawing data is registered in the drawing data storage control means. The areas R1 to R16 are unit drawing areas and individual pieces of drawing data are stored in association with the unit drawing areas containing their minimum value of Y coordinate. Herein, although the graphic in FIG. 31 is represented by six trapezoids, other split methods may be used.

Next, a method for generating load estimated values from the drawing data will be explained. The method for generating load estimated values is made according to the flowchart explained in FIG. 28. First, when drawing data is generated, the minimum and maximum values on an axis (Y axis in this case) used to assign processing by the processing responsibility range assignment means are calculated (S90). Next, numeric values between the minimum and maximum values of the unit load estimated value table are incremented (S91). The number of incremented unit areas is added to the load sum value (S92).

FIG. 37 shows changes of values of the unit load estimated value table immediately after individual pieces of drawing data have been inputted. At an initial state, all unit areas and the load sum value of all unit areas are initialized to 0. When the first drawing data D1 is inputted, the minimum value R1 and maximum value R2 on the Y axis are obtained. Numeric values are incremented for each of unit areas R1 and R2. As a result, all unit load estimated values corresponding to D1 become 1. 2, which is the number of unit areas R1 and R2, is added to the load sum value, so that 2 is obtained as a current load sum value.

Next, when drawing data D2 is inputted, a minimum value R3 and a maximum value R10 are obtained. Numeric values are incremented for each of unit areas R3 to R10. As a result, all unit load estimated values corresponding to D2 become 1. 8, which is the number of unit areas R3 to R10, is added to the load sum value, so that 10 is obtained as a current load sum value.

Thereafter, in the same manner, when all pieces D3 to D6 of the drawing data are inputted, the unit load estimated value of unit areas R1 to R4 is 1, the unit load estimated value of unit areas R5 to R12 is 2, and the unit load estimated value of unit areas R13 to R16 is 1. The load sum value is 24.

Using the unit load estimated value table and the load sum value, the processing responsibility range assignment means 14 divides the total number 24 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

If the number of drawing processing means 15 is three, a load quantity assigned to one drawing processing means 15 is 8. The result of assignment of a responsibility range to each drawing processing means 15 by the processing responsibility range assignment means 14 is shown in FIG. 38. As a result, a range from R1 to R6 is assigned to the drawing processing means A, a range from R7 to R10 is assigned to the drawing processing means B, and a range from R11 to R16 is assigned to the drawing processing means C.

By representing graphic data in trapezoid-split form, as described above, loads can be represented correctly even when concave graphics are inputted.

Although a single load estimated value table is used in this embodiment to simplify explanation, unit load estimated values can be calculated using the same incoming and outgoing tables as in the embodiment 1. Although explanation has been made using one graphic, it goes without saying that loads can be represented correctly regardless of the number of graphics as long as a plurality of graphics are represented in the same graphic data format.

Embodiment 5

Figure 39:
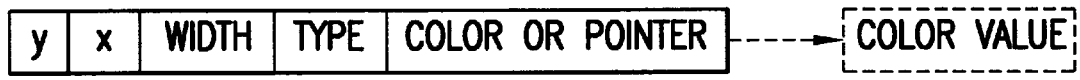
FIG. 39 shows an example of run-length data.

In an embodiment 5, the load estimated value calculating means 12 calculates load estimated values by using graphic data represented in run-length form, explained in FIG. 39.

FIG. 39 shows a data structure for representing a drawing area in run-length form that represents graphic data as the length of the area in a scanning line direction. The term run-length form refers to the representation of a graphic to be drawn by a starting point and length (width) on a scanning line. y denotes the Y coordinate value at a starting point, x denotes the X coordinate value at a starting point, and width indicates a length on a scanning line. In addition to these, the data structure is composed of a type and color or pointer to color. A type is used to determine whether the next field indicates a color value itself or a pointer to color. In this example, a value of 0 in the type field indicates a color value itself, and a value of 1 indicates a pointer to color. In this example, an area length is represented by a starting point and length, but it may be represented by a starting point and an ending point. Data representing Y coordinate values may be represented collectively by another data structure.

Figure 40:
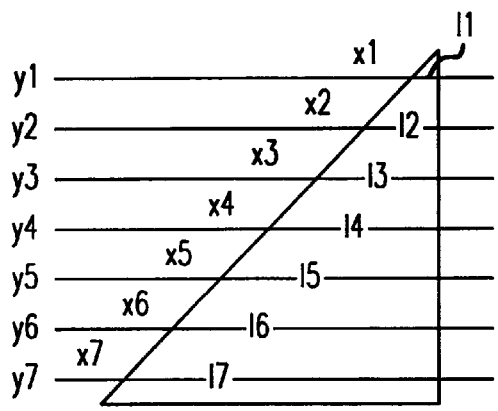
FIG. 40 shows an example of representing a graphic by run-length data.

FIG. 40 shows data represented in run-length form, shown in FIG. 39; a triangle is represented as an example. y1 to y7 to the left indicate scanning lines. X coordinate values at which the triangle intersects with the scanning lines are represented by x1 to x7. The lengths denoting the inside of the triangle on the scanning lines are represented by 11 to 17. This example indicates that the inside is painted with a specified color value "color".

Figures 41, 42:
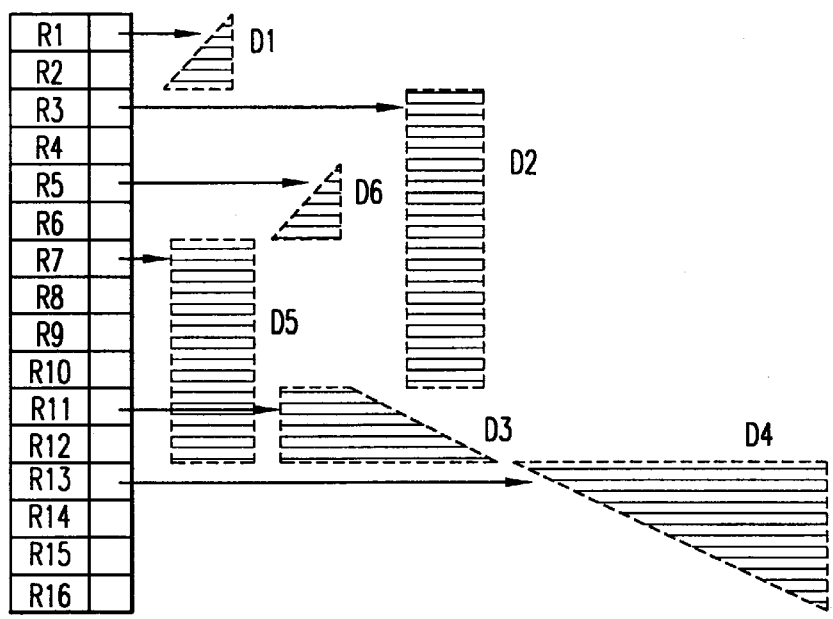
FIG. 41 shows an example of registering run-length data in the drawing data storage control means.
FIG. 42 shows changes of values of a unit load estimated value table.

FIG. 41 is a conceptual diagram for the generation of graphic data of the graphic in FIG. 31 by the run-length representation explained in FIG. 39. In this example, the graphic shown in FIG. 31 is composed of a collection of graphics D1 to D6 represented in run-length form. The figure shows the state in which generated drawing data is registered in the drawing data storage control means 13. The areas R1 to R16 are unit drawing areas and individual pieces of drawing data are stored in association with the unit drawing areas containing their minimum value of Y coordinate. In this example, each unit area consists of two scanning lines. Although, in this example, the upper left points of graphic data are associated with the existing unit drawing areas, other methods such as, for example, storing on a scanning line basis may be used.

Next, a method for generating load estimated values from the drawing data will be explained. The method for generating load estimated values is made according to the flowchart explained in FIG. 28. First, when drawing data is generated, the minimum and maximum values on an axis (Y axis in this case) used to assign processing by the processing responsibility range assignment means are calculated (S90). Next, between the minimum and maximum values of the unit load estimated value table, the number of data pieces in each graphic data is added to corresponding portion of the unit load estimated value table (S91). The number of added data pieces is added to the load sum value (S92).

FIG. 42 shows changes of values of the unit load estimated value table immediately after individual pieces of drawing data have been inputted. At an initial state, all unit areas and the load sum value of all unit areas are initialized to 0. When the first drawing data D1 is inputted, the minimum value R1 and maximum value R2 on the Y axis are obtained. The number of pieces of the drawing data existing in the unit areas is added for each of the unit areas R1 and R2. As a result, all unit load estimated values corresponding to D1 become 2. 4, which is the total number of data pieces of D1, is added to the load sum value, so that 4 is obtained as a current load sum value.

Next, when drawing data D2 is inputted, a minimum value R3 and a maximum value R10 are obtained. The number of pieces of the drawing data existing in the unit areas is added for each of unit areas R3 to R10. As a result, all unit load estimated values corresponding to D2 become 2. 16, which is the total number of data pieces of D2, is added to the load sum value, so that 20 is obtained as a current load sum value.

Thereafter, in the same manner, when all pieces D3 to D6 of the drawing data are inputted, the unit load estimated value of unit areas R1 to R4 is 2, the unit load estimated value of unit areas R5 to R12 is 4, and the unit load estimated value of unit areas R13 to R16 is 2. The load sum value is 48.

Using the unit load estimated value table and the load sum value, the processing responsibility range assignment means 14 divides the total number 48 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

Figures 43, 44:
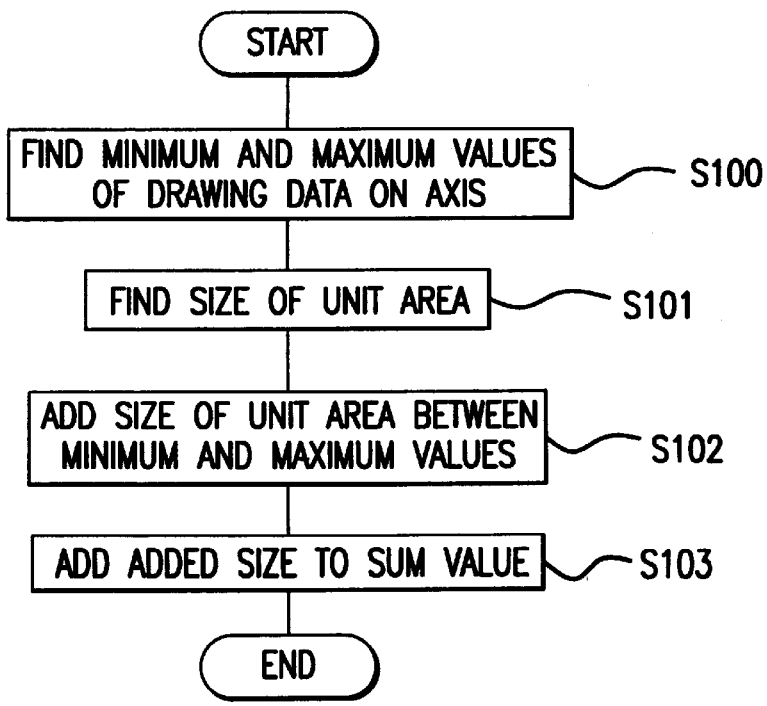
FIG. 43 shows an example of the result of splitting and processing assignment.
FIG. 44 is a flowchart of load estimated value creating processing.

If the number of drawing processing means 15 is three, a load quantity assigned to one drawing processing means 15 is 16. The result of assignment of a responsibility range to each drawing processing means 15 by the processing responsibility range assignment means 14 is shown in FIG. 43. As a result, a range from R1 to R6 is assigned to the drawing processing means A, a range from R7 to R10 is assigned to the drawing processing means B, and a range from R11 to R16 is assigned to the drawing processing means C.

By representing graphic data in a run-length form as described above, loads can be represented correctly even when concave graphics are inputted.

Although a single load estimated value table is used in this embodiment to simplify explanation, unit load estimated values can be calculated using the same incoming and outgoing tables as in the embodiment 1. Although explanation has been made using one graphic, it goes without saying that loads can be represented correctly regardless of the number of graphics as long as a plurality of graphics are represented in the same graphic data format.

Embodiment 6

In the embodiments 2, 3, 4, and 5, the number of pieces of drawing data is projected onto an axis used for splitting by the processing responsibility range assignment means 14 to estimate loads. In an embodiment 6, the area of drawing data is projected onto an axis used for splitting by the processing responsibility range assignment means 14 to estimate loads. In this embodiment, the load estimated value calculating means 12 calculates an area by using a minimum rectangle surrounding drawing data.

A method used in this embodiment is conceptually the same as in a case of projecting the number of pieces of drawing data explained in FIG. 27, but is different in using areas instead of the number of pieces as load estimated values.

FIG. 44 is a flowchart explaining the flow of processing to create load estimated values after drawing data is received from the drawing data generating means. In this case also, unit load estimated values are explained using a tabular data structure. A work area for calculating a sum value of all loads is also used.

In FIG. 44, when drawing data is received, a minimum value and a maximum value on an axis (Y axis in this case) used to assign processing by the processing responsibility range assignment means are calculated (S100). Next, an area per unit area is calculated (S101). This can be obtained by finding the length of a graphic, in X-axis direction, representing a minimum rectangle surrounding the drawing data. Next, the area of unit areas is added between the minimum and maximum values of the unit load estimated value table (S102). A value obtained by multiplying the number of unit areas subjected to the add operation by the area of the unit areas is added to the sum value (S103).

Figures 45, 46:
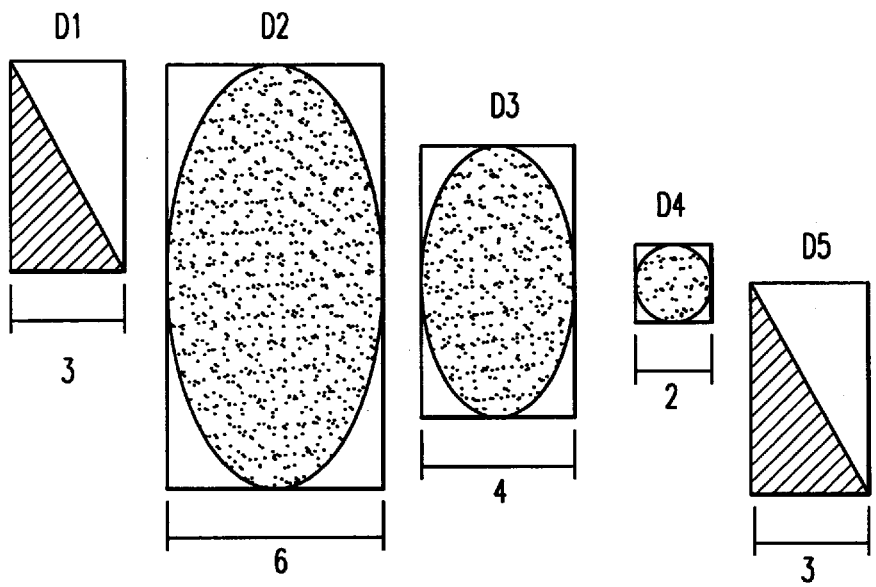
FIG. 45 shows an example of minimum rectangles surrounding drawing data.
FIG. 46 shows changes of values of a unit load estimated value table.

FIG. 45 shows minimum rectangles surrounding individual pieces of drawing data used as input data, shown in FIG. 19. The lengths of rectangles D1, D2, D3, D4, and D5 in X-axis direction are 3, 6, 4, 2, and 3, respectively. Unit load estimated values are calculated using these values.

FIG. 46 shows changes of values of the unit load estimated value table immediately after individual pieces of the drawing data have been inputted. At an initial state, all unit areas and the load sum value of all unit areas are initialized to 0. When the first drawing data D2 is inputted, the minimum value R1 and maximum value R16 on the Y axis are obtained. 6, which is the length of D2 in the X-axis direction, is added for each of the unit areas R1 and R16. As a result, all unit load estimated values corresponding to D2 become 6. A value 96 obtained by multiplying the number of unit areas R1 to R16, 16, by the length in the X-axis direction, 6, is added to the load sum value, so that 96 is obtained as a current load sum value.

Next, when drawing data D3 is inputted, a minimum value R5 and a maximum value R12 are obtained. 4, which is the length in the X-axis direction, is added for each of the unit areas R5 to R12. As a result, all unit load estimated values corresponding to D3 become 10. A value 32 obtaining by multiplying the number of unit areas R5 to R12, 8, by the length in the X-axis direction, 4, is added to the load sum value, so that 128 is obtained as a current load sum value.

Thereafter, in the same manner, when all pieces D4, D5, and D1 of the drawing data are inputted, the unit load estimated values of unit areas R1 to R4, R5 to R7, R8 to R9, R10 to R12, and R13 to R16 are 9, 13, 15, 13, and 9, respectively. The load sum value is 180.

Using the unit load estimated value table and the load sum value, the processing responsibility range assignment means 14 divides the total number 180 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

Figure 47:
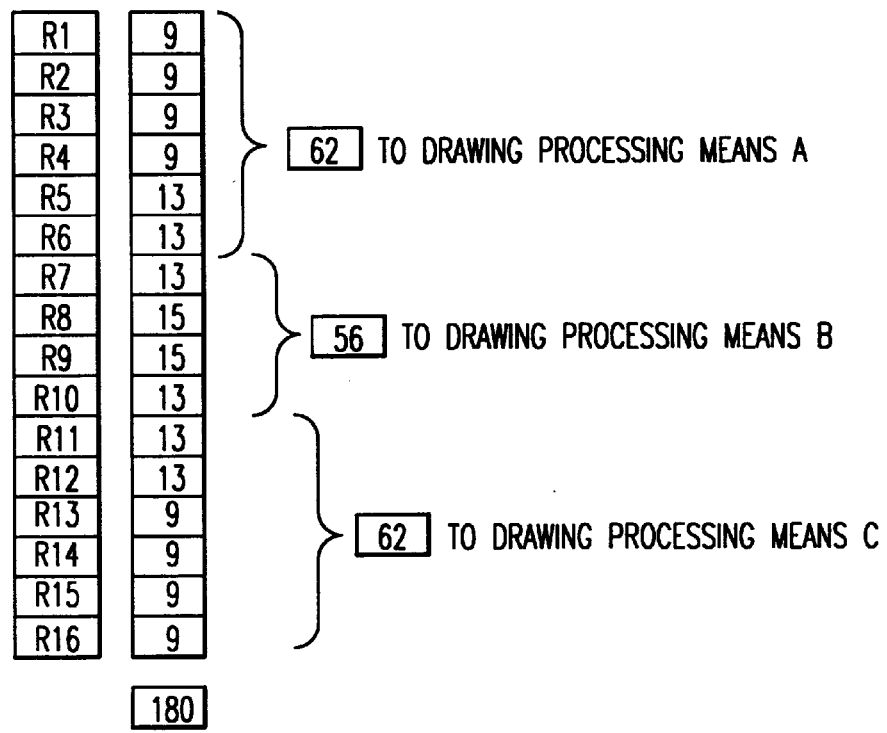
FIG. 47 shows an example of the result of splitting and processing assignment.

If the number of drawing processing means 15 is three, a load quantity assigned to one drawing processing means 15 is 60. The result of assignment of a responsibility range to each drawing processing means 15 by the processing responsibility range assignment means 14 is shown in FIG. 47. As a result, a range from R1 to R6 is assigned to the drawing processing means A, a range from R7 to R10 is assigned to the drawing processing means B, and a range from R11 to R16 is assigned to the drawing processing means C.

In this case, areas have already been assigned to the drawing processing means B before the load quantity reaches 60. This is achieved by further determination of whether the unit load quantity of the next unit area should be added to a current load quantity or not to bring a load quantity closer to a reference value when the processing responsibility range assignment means 14 extends the areas because the load quantity cannot be perfectly equalized.

In this example, to determine whether to assign the next unit area R11 after extending the areas to be assigned from R7 to R10, the result of adding or not adding the load quantity 13 of R11 is compared with the reference value 60. Herein, 56+13=69. Since the absolute value of a difference from the reference value 60 is 9 in the case of extending to R11 and 4 in the case of not extending to R11, the case of not extending R11 is selected, so that the drawing areas R7 to R10 are assigned to the drawing processing means B.

Although a single load estimated value table is used in this embodiment to simplify explanation, unit load estimated values can be calculated using the same incoming and outgoing tables as in the embodiment 1.

Embodiment 7

In the embodiment 6, although the area of drawing data is represented by a minimum rectangle surrounding drawing data, the area of actual drawing data is not represented correctly.

In an embodiment 7, the load estimated value calculating means 12 calculates load estimated values using areas as in the embodiment 6 by using graphic data represented in trapezoid-split form, explained in FIG. 35.

The area of trapezoidal data can be calculated by the formula for finding the area of general trapezoids: (upper side+lower side)×height÷2. However, to calculate the area of trapezoidal data existing in each unit drawing area, the upper and lower sides within each unit drawing area are calculated. When (X2−X1) in FIG. 35 is used as an upper side in an initial state, the lower side can be calculated by (X2−X1+DX1+DX2). In the next unit drawing area, with the lower side in the preceding unit drawing area used as an upper side, a new lower side can be calculated as (X2−X1+DX1+DX2+DX1+DX2). That is, the formula of trapezoid is used only in an initial state, and subsequently, (DX1+DX1) has only to be added to the preceding area. The same formula (an upper or lower side is 0) can also apply to triangles.

Figure 48:
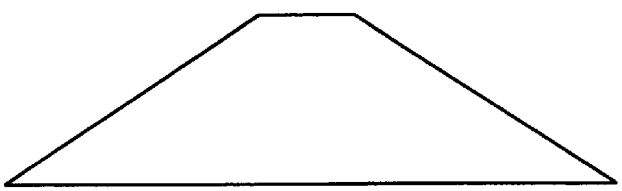
FIG. 48 shows an example of trapezoid-split data.

This embodiment will be explained using the graphic shown in FIG. 48. The numeric values showing the shape of the trapezoid in FIG. 48 are as follows: 16 as the maximum YMAX and 1 as the minimum YMIX of Y coordinate values, 1.5 as the X coordinate value X1 at the position of the minimum of Y coordinate values and 1.5 as an increment DX1 of X coordinate values at an increase of a unit quantity of Y coordinate values on the left side, and 3 as the X coordinate value X2 at the position of the minimum of Y coordinate values and 1.5 as an increment DX2 of X coordinate values at an increase of a unit quantity of Y coordinate values on the right side. Accordingly, as the area of the trapezoid in an initial state, 3 (=(1.5+4.5)×1÷2) is obtained. An area at a shift to the next unit area is incremented by 3 (=DX1+DX2).

Figure 49:
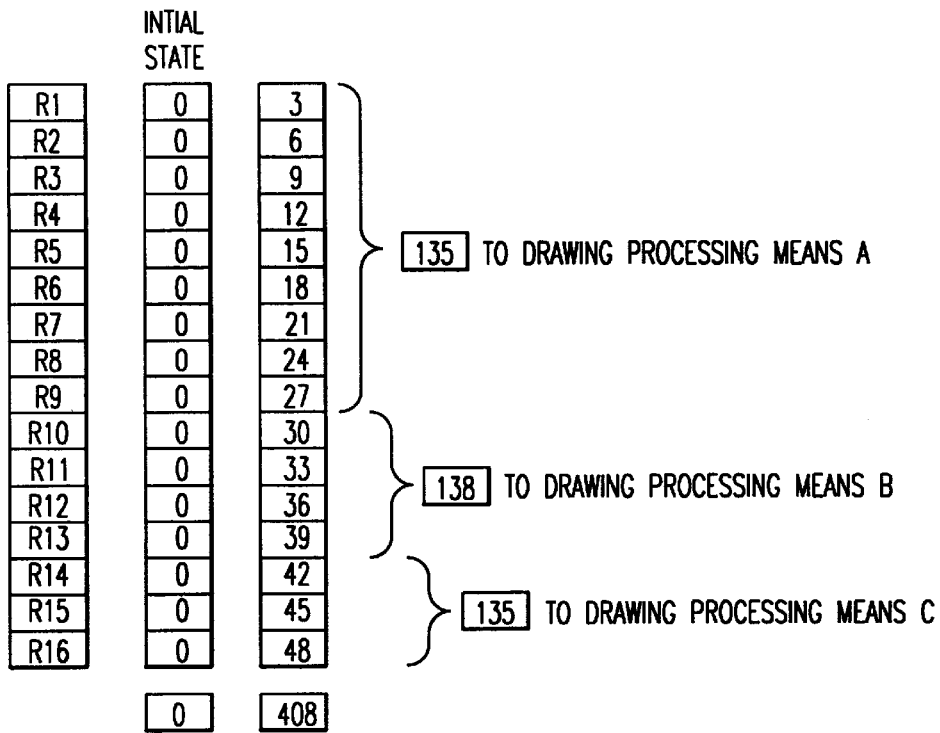
FIG. 49 shows changes of values of a unit load estimated value table.

FIG. 49 shows changes of values of the unit load estimated value table immediately after individual pieces of the drawing data in FIG. 48 have been inputted. The following explanation assumes that the width of a unit area is 1. At an initial state, all unit areas and the load sum value of all unit areas are initialized to 0. When the data in FIG. 48 is inputted, as the area value of area R1, 3 is calculated as shown in FIG. 48. Next, as the size of area R2, 6 is calculated as the result of adding an increment 3 to the preceding area value 3. Thereafter, in the same way, 9, 12, 15, . . . , 48 are calculated. A value 408 resulting from summing up the areas from R1 to R16 is added to the sum value.

Using the unit load estimated value table and the load sum value, the processing responsibility range assignment means 14 divides the total number 408 of loads by the number of drawing processing means 15 as in the case of the embodiment 6 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

If the number of drawing processing means 15 is three, a load quantity assigned to one drawing processing means 15 is 136. The result of assignment of a responsibility range to each drawing processing means 15 by the processing responsibility range assignment means 14 is shown in FIG. 44. As a result, a range from R1 to R9 is assigned to the drawing processing means A, a range from R10 to R13 is assigned to the drawing processing means B, and a range from R14 to R16 is assigned to the drawing processing means C.

In this case, areas have already been assigned to the drawing processing means A before the load quantity reaches 136. As explained in the embodiment 6, this is because it is determined whether the unit load quantity of the next unit area should be added to a current load quantity or not to bring a load quantity closer to a reference value when the processing responsibility range assignment means extends the areas because the load quantity cannot be perfectly equalized.

In this example, to determine whether to assign the next unit area R10 after extending the areas to be assigned from R1 to R9, the result of adding or not adding the load quantity 30 of R10 is compared with the reference value 136. Herein, 135+30=165. Since the absolute value of a difference from the reference value 136 is 29 in the case of extending to R10 and 1 in the case of not extending to R10, the case of not extending R11 is selected, so that the drawing areas R1 to R9 are assigned to the drawing processing means A.

Although a single load estimated value table is used in this embodiment to simplify explanation, unit load estimated values can be calculated using the same incoming and outgoing tables as in the embodiment 1.

Although explanation has been made using one graphic, it goes without saying that loads can be represented correctly regardless of the number of graphics as long as a plurality of graphics are represented in the same graphic data format.
Embodiment 8

In this embodiment, the load estimated value calculating means 12 calculates load estimated values using areas as in the embodiment 6 by using the graphic data represented in a run-length form, explained in FIG. 39.

This embodiment will be explained using the graphic explained in FIG. 48. Similarly to the embodiment 7, in the case of run-length form, load estimated values are calculated using the length of run as area values.

To calculate the area of a trapezoid in the embodiment 7, the length of the inside of the graphic on each scanning line is calculated. Since the length of the inside of a trapezoid is the length of run of run length, the same result as in the embodiment 7 is obtained.

Although explanation has been made using one graphic in this embodiment also, it goes without saying that loads can be represented correctly regardless of the number of graphics as long as a plurality of graphics are represented in the same graphic data format.
Embodiment 9

In the embodiments having been described so far, a description has been made about a method for calculating load estimated values and equalizing loads when vector data, trapezoid-split data, and run-length data each exist singly.

In the embodiment 9, a description will be made about a method for calculating load estimated values when different types of drawing data coexist. In this embodiment, a description will be made about a case of calculating load estimated values using the number of pieces of drawing data projected on an axis used to assign processing by the processing responsibility range assignment means 14.

Figure 50:
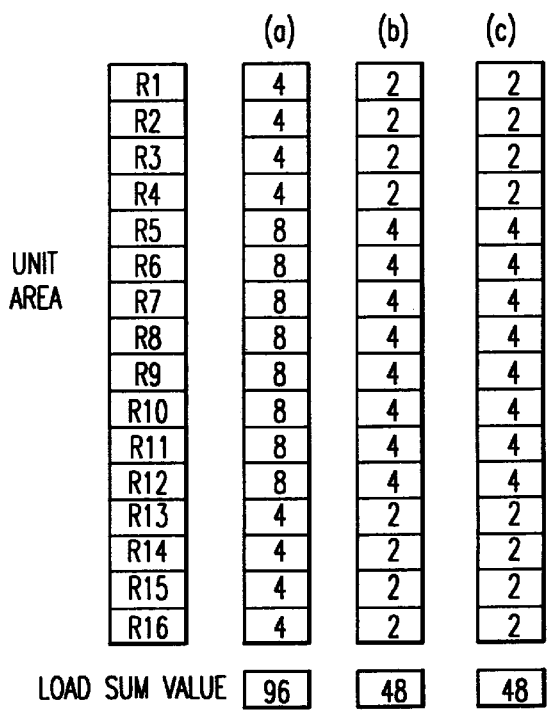
FIG. 50 shows an example of load estimated values by drawing data type.

When the type of drawing data is different, different load values will be obtained when the same graphic is processed. There are shown examples of calculating load estimated values, on the basis of all drawing data, under the same condition for the graphic in FIG. 31. FIG. 50 shows the case where as a condition, each unit area is composed of two scanning lines.

FIG. 50 (*a*) shows loads in vector data. The numeric values are calculated from FIG. 33. A unit area was treated simply as a single area at explanation of FIG. 33, but since as a condition in this embodiment, a unit area is composed of two scanning lines, the numeric values are simply doubled. As apparent from FIG. 50 (*a*), a load value by the vector data of the graphic shown in FIG. 31 is 96.

FIG. 50 (*b*) shows loads in trapezoid-split data. The numeric values are calculated from FIG. 37. A unit area was treated simply as a single area at explanation of FIG. 37, but since as a condition in this embodiment, a unit area is composed of two scanning lines, the numeric values are simply doubled. As apparent from FIG. 50 (*b*), a load value by the trapezoid-split data of the graphic shown in FIG. 31 is 48.

FIG. 50 (*c*) shows loads in run-length data. The numeric values are the same as those in FIG. 42 because the condition is the same as at explanation of FIG. 42. As apparent from FIG. 50 (*c*), a load value by the run-length data of the graphic shown in FIG. 31 is 48.

As described above, it is apparent that different types of drawing data cause different load estimated values to be generated. For different types of drawing data, different operations must be performed in internal processing, for example, drawing processing shown in FIG. 17. Specifically, this is because for vector data, no areas are established until corresponding vectors are determined, while for trapezoid-split data and run-length data, the end of areas are known in advance because the data represents areas themselves. Accordingly, internal processing is different and actual processing time is different. That is, it can be said that load estimated values representing processing time are numeric values represented in a unit different for each drawing data.

Accordingly, when different types of drawing data coexist, a coefficient must be multiplied to correct load estimated values for each type of drawing data.

Figure 51:
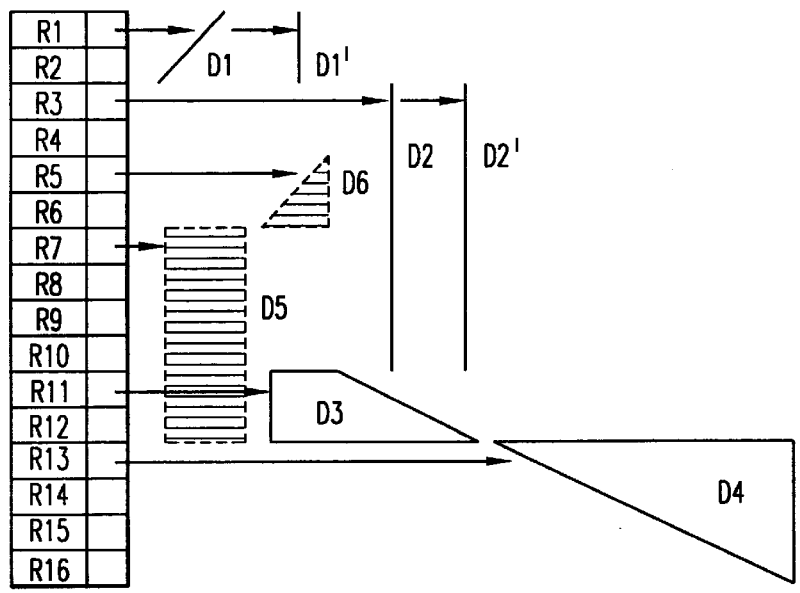
FIG. 51 shows an example of registration of different types of drawing data in the drawing data storage control means.

FIG. 51 shows an example of representation by vector data, trapezoid-split data, and run-length data for a graphic shown in FIG. 31. As shown in FIG. 51, D1, D1', D2, and D2' are represented by vector data, D3 and D4 by trapezoid-split data, and D5 and D6 by run-length data. As a condition, each unit area is composed of two scanning lines.

Figure 52:
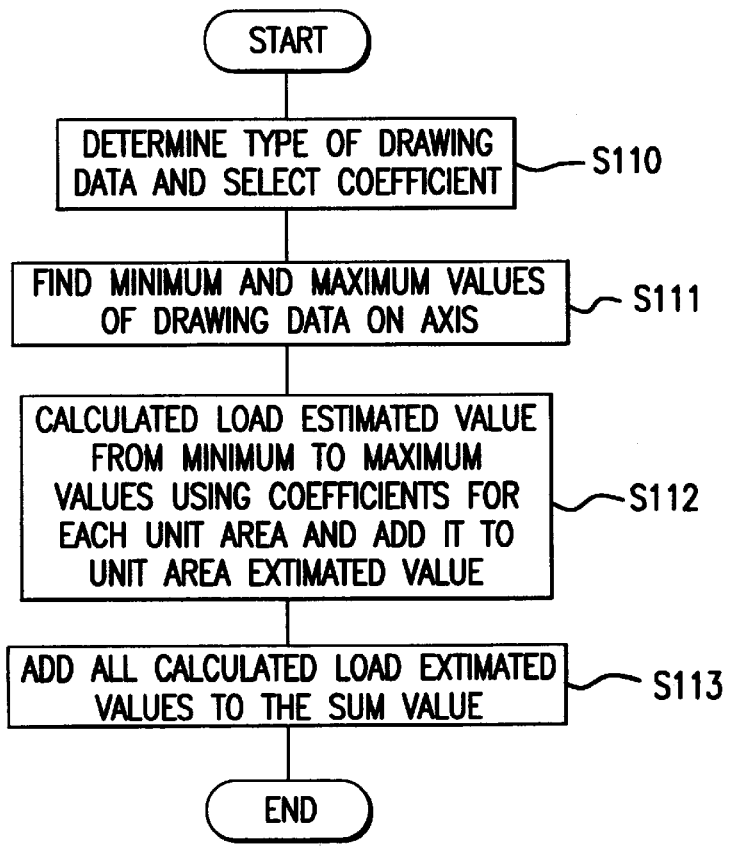
FIG. 52 is a flowchart of load estimated value creating processing.

The following will explain a method for generating load estimated values from a mixture of different types of drawing data. Load estimated values are generated according to the flowchart shown in FIG. 52. In FIG. 52, first, when drawing data is generated, the type of drawing data is determined and a coefficient defined for each type of drawing data is selected (S110). Next, a minimum value and a maximum value on an axis (Y axis in this case) used to assign processing by the processing responsibility range assignment means 14 are calculated (S111). Next, a load estimated value is calculated for each unit area between the minimum and maximum values of the unit load estimated value table, it is multiplied by the coefficient, and the resultant value is added to the load estimated value of a corresponding unit area (S112). The calculated load estimated value is added to the load sum value (S113).

Next, a specific example is used for explanation. The explanation assumes that vector data, trapezoid-split data, and run-length data have coefficients of 1, 2, and 2, respectively.

Figures 53, 54:
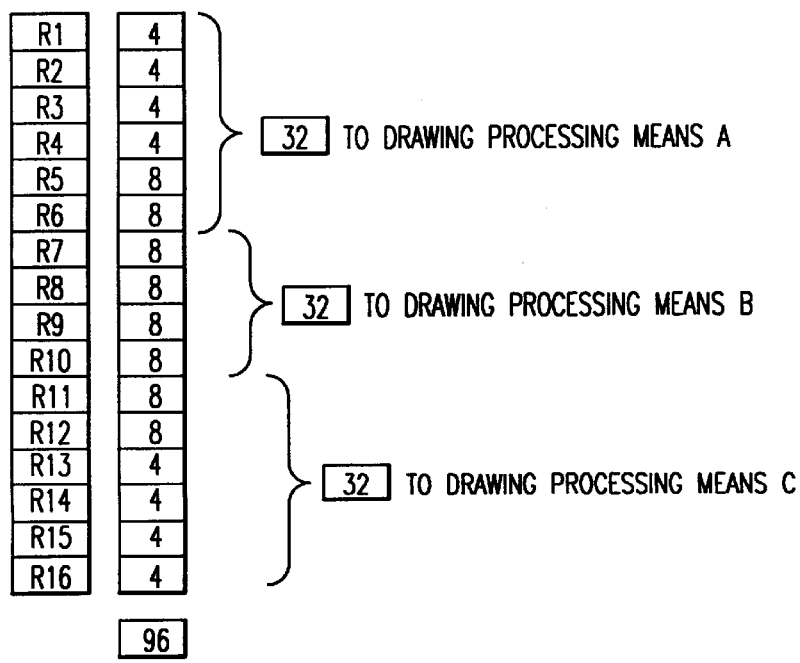
FIG. 53 shows changes of values of a unit load estimated value table.
FIG. 54 shows an example of the result of splitting and processing assignment.

FIG. 53 shows changes of values of the unit load estimated value table immediately after individual pieces of drawing data have been inputted. At an initial state, all unit areas and the load sum value of all unit areas are initialized to 0. When vector data D1 is inputted as the first drawing data, 1 is selected as the coefficient of vector data. Next, a minimum value R1 and a maximum value R2 on the Y axis are obtained. As a load estimated value in unit area R1, since the number of scanning lines within the unit area is 2 and the coefficient is 1, 2 (=2 (the number of scanning lines)×1 (coefficient)) is obtained. Similarly, as a load estimated value in unit area R2, 2 (=2 (the number of scanning lines)×1 (coefficient)) is obtained. Accordingly, when up to D1 has been inputted, 4 (=2+2) is obtained as the sum of load estimated values.

Next, when drawing data D1' is inputted, 1 is selected as the coefficient of vector data. Next, a minimum value R1 and a maximum value R2 on the Y axis are obtained. Similarly, as a load estimated value in unit area R1, 2 (=2 (the number of scanning lines)×1 (coefficient)) is obtained. As a load estimated value in unit area R2, 2 (=2 (the number of scanning lines)×1 (coefficient)) is obtained. 4 is obtained as the sum of load estimated values of D1'. As a result, the load estimated values of R1 and R2 are 4, respectively. When up to D1' has been inputted, 8 is obtained as the sum of load estimated values.

In the same way, when the loads of D2 and D2' are calculated, the load estimated values of unit areas R3 to R10 are 4, respectively. When up to D2' has been inputted, 40 is obtained as the sum of load estimated values.

Next, when drawing data D3 is inputted, the coefficient 2 of trapezoid-split data is selected. Next, a minimum value R11 and a maximum value R12 on the Y axis are obtained. Similarly, as a load estimated value in unit area R11, 4 (=2 (the number of scanning lines)×2 (coefficient)) is obtained. As a load estimated value in unit area R2, 4 (=2 (the number of scanning lines)×2 (coefficient)) is obtained. 8 is obtained as the sum of load estimated values of D3. As a result, the load estimated values of R11 and R12 are 4, respectively. When up to D3 has been inputted, 48 is obtained as the sum of load estimated values.

In the same way, when the load of D4 is calculated, the load estimated values of unit areas R13 to R16 are 4, respectively. When up to D4 has been inputted, 64 is obtained as the sum of load estimated values.

Next, when drawing data D5 is inputted, the coefficient 2 of run-length data is selected. Next, a minimum value R7 and a maximum value R12 on the Y axis are obtained. Similarly, as load estimated values in unit areas R7 to R12, 4 (=2 (the number of scanning lines)×2 (coefficient)) is obtained, respectively. 24 is obtained as the sum of load estimated values of D5. As a result, the load estimated values of R7 and R12 are 8, respectively. When up to D5 has been inputted, 88 is obtained as the sum of load estimated values.

In the same way, when the load of D6 is calculated, the load estimated values of unit areas R5 and R6 are 8, respectively. When up to D4 has been inputted, 96 is obtained as the sum of load estimated values.

Using the unit load estimated value table and the load sum value, the processing responsibility range assignment means 14 divides the total number 96 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

If the number of drawing processing means 15 is three, a load quantity assigned to one drawing processing means 15 is 32. The result of assignment of a responsibility range to each drawing processing means 15 by the processing responsibility range assignment means 14 is shown in FIG. 54. As a result, a range from R1 to R6 is assigned to the drawing processing means A, a range from R7 to R10 is assigned to the drawing processing means B, and a range from R11 to R16 is assigned to the drawing processing means C.

In this way, by multiplying a load estimated value by a coefficient specific to the type of drawing data, even when different types of drawing data coexist, a correct load estimated value can be obtained.

Although a single load estimated value table is used in this embodiment to simplify explanation, unit load estimated values can be calculated using the same incoming and outgoing tables as in the embodiment 1. Although explanation has been made using one graphic, it goes without saying that loads can be represented correctly regardless of the number of graphics as long as a plurality of graphics are represented in the same graphic data format.

Embodiment 10

In the embodiments having been described so far, the types of colors for painting graphics have not been considered. However, since internal processing is different for each of the types of colors just as processing is different for each of the types of drawing data, actual processing time is influenced. In this embodiment, a description is made about a method for multiplying a coefficient to correct a load estimated value for each of the types of colors.

Figure 55:
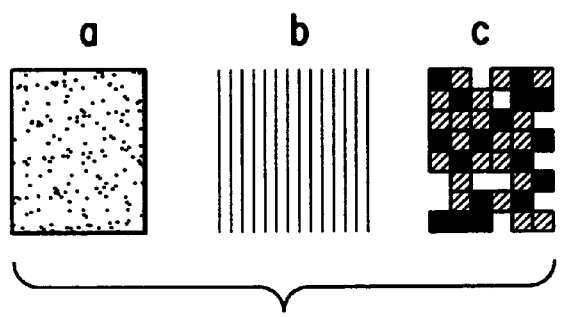
FIG. 55 shows an example of color types.

FIG. 55 shows an example of color types. A constant value color shown in FIG. 55 (a) is used to paint one graphic in the same color at all times. A pattern color shown in FIG. 55 (b) is used to paint one piece of graphic data by repeatedly using a defined set of color values of a prescribed size. A raster shown in FIG. 55 (c) is used for image data or the like, with a color value specified for each pixel.

Constant value color processing is performed in by painting a corresponding range in a specified color after the inside of graphic data is determined. One example is to output the same color value in a range from a starting point X1 to an ending point X2.

Pattern color processing is performed in a manner that determines the position from which to repeat processing within a set of color values from corresponding coordinates after the inside of graphic data is determined, and repeatedly performs processing until the inside of graphic data is completely filled with a set of color values of the defined size. For example, when a pattern is regularly placed from the origin, a coordinate value within the pattern is calculated using a remainder resulting from dividing the coordinate value of a starting point (X1, Y1) by the size of the pattern, and color values within the pattern are repeatedly outputted up to the coordinates (X2, Y2) of an ending point therefrom.

Raster processing is performed in a manner that calculates a pixel position within raster data from corresponding coordinates after the inside of graphic data is determined, and outputs the pixel value of calculated width. One example is that a pixel position (PX1, PY1) within a raster is calculated from the coordinate value of a starting point (X1, Y1) and pixel values themselves are outputted while moving pixel positions up to an ending point (X2, Y2).

As described above, internal processing differs, depending on the types of colors. Accordingly, a coefficient must be multiplied to correct a load estimated value according to the types of colors for painting the inside of graphic data.

Herein, it is assumed that there are three types of colors: constant value color, pattern color, and raster. The example in FIG. 56 shows a rectangle D1 of constant value color at the outermost side, a rectangle D2 of pattern color at the inner side thereof, and a rectangle D3 of raster color at the innermost side.

Figure 56:
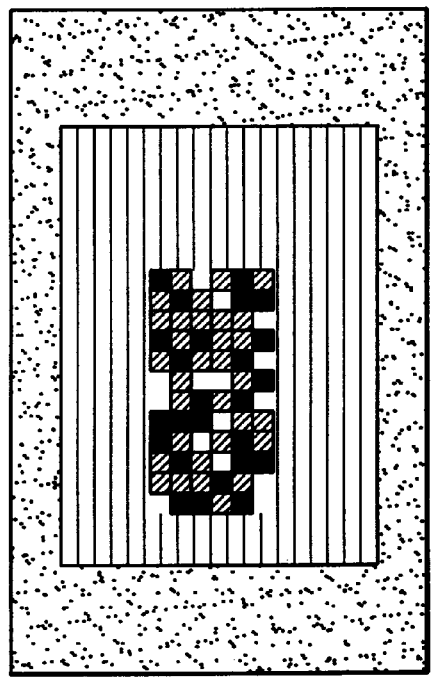
FIG. 56 shows an example of a drawing graphic containing different types of colors.
Figure 57:
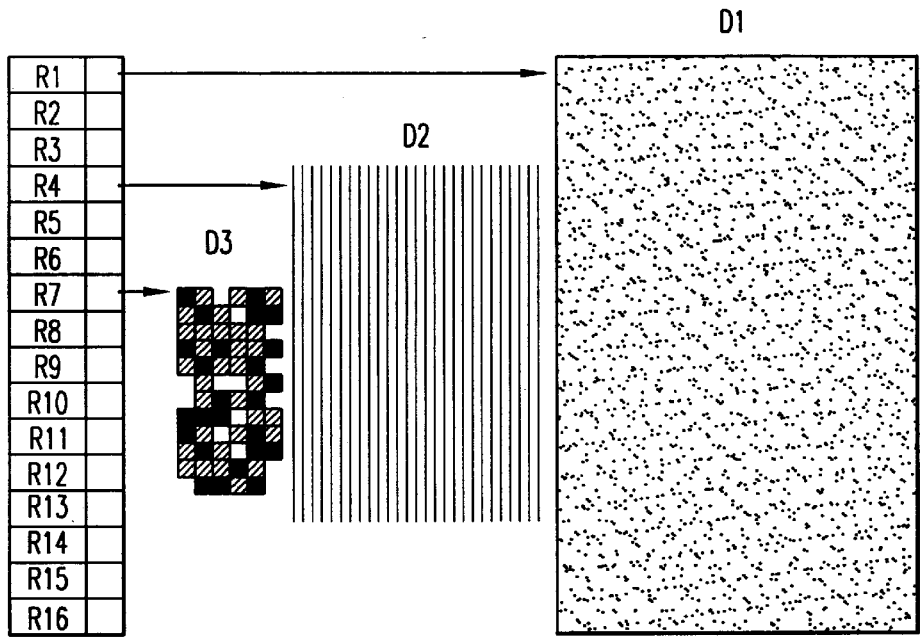
FIG. 57 shows an example of registration of a graphic containing different types of colors in the wing data storage control means.

FIG. 57 shows the state in which the graphic in FIG. 56 is registered in the drawing data storage control means. The areas R1 to R16 are unit drawing areas; individual pieces of the drawing data are stored in association with the unit drawing areas containing their starting point.

Figure 58:
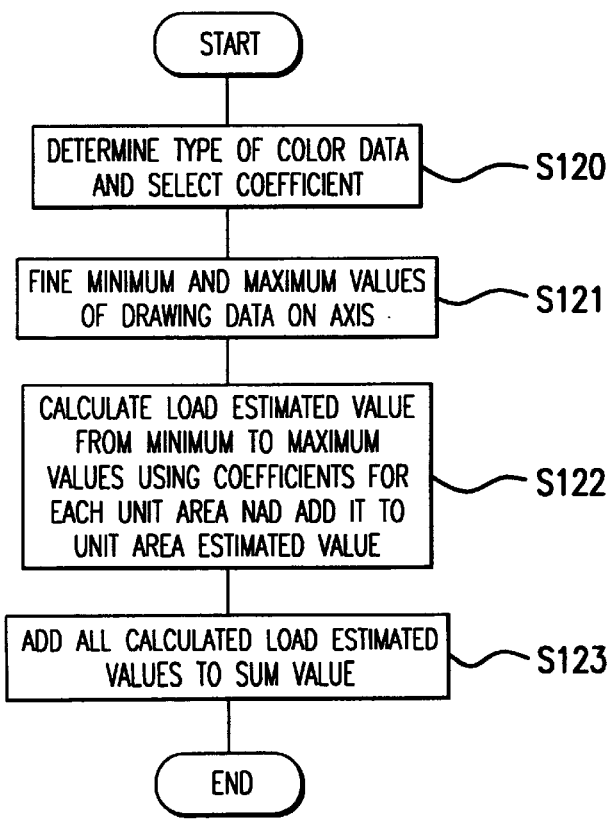
FIG. 58 is a flowchart of load estimated value creating processing.

The following will explain a method for generating load estimated values from drawing data having different types of colors. Load estimated values are generated according to the flowchart shown in FIG. 58. In FIG. 58, first, when drawing data is generated, the type of color for painting the inside of drawing data is determined and a coefficient defined for each type of color is selected (S120). Next, a minimum value and a maximum value on an axis (Y axis in this case) used to assign processing by the processing responsibility range assignment means are calculated (S121). Next, a load estimated value is calculated for each unit area between the minimum and maximum values of the unit load estimated value table, it is multiplied by the coefficient, and the resultant value is added to the load estimated value of a corresponding unit area (S122). The calculated load estimated value is added to the load sum value (S123).

Next, a specific example is used for explanation. The explanation assumes that constant value color, pattern color, and raster color have coefficients of 1, 2, and 3, respectively, to correct processing by color type. The number of pieces of drawing data is used as a load estimated value of drawing data.

FIG. 59 shows changes of values of the unit load estimated value table immediately after individual pieces of drawing data have been inputted. At an initial state, all unit areas and the load sum value of all unit areas are initialized to 0. When vector data D1 is inputted as the first drawing data, 1 is selected as the coefficient of constant value color. Next, a minimum value R1 and a maximum value R16 on the Y axis are obtained. As a load estimated value in unit area R1, since the coefficient is 1, 1 (=1 (the number of pieces)×1 (coefficient)) is obtained. Similarly, as load estimated values in unit areas R2 to R16, 1 (=1 (the number of pieces)×1 (coefficient)) is obtained, respectively. Accordingly, when D1 has been inputted, 16 (=1 (unit load estimated value)×16 (the number of unit drawing areas)) is obtained as the sum of load estimated values.

When the next drawing data D2 is inputted, the coefficient 2 of pattern color is selected. Next, a minimum value R4 and a maximum value R13 on the Y axis are obtained. As a load estimated value in unit area R4, since the coefficient is 2, 2 (=1 (the number of pieces)×2 (coefficient)) is obtained. Similarly, as load estimated values in unit areas R5 to R13, 2 (=1 (the number of pieces)×2 (coefficient)) is obtained, respectively. Accordingly, when D2 has been inputted, 20 (=2 (unit load estimated value)×10 (the number of unit drawing areas)) is obtained as the sum of load estimated values, and when up to D2 has been inputted, 36 is obtained as the sum of load estimated values.

When the next drawing data D3 is inputted, the coefficient 2 of raster is selected. Next, a minimum value R7 and a maximum value R12 on the Y axis are obtained. As a load estimated value in unit area R7, since the coefficient is 3, 3 (=1 (the number of pieces)×3 (coefficient)) is obtained. Similarly, as load estimated values in unit areas R8 to R12, 3 (=1 (the number of pieces)×3 (coefficient)) is obtained, respectively. Accordingly, when D3 has been inputted, 18 (=3 (unit load estimated value)×6 (the number of unit drawing areas)) is obtained as the sum of load estimated values, and when up to D3 has been inputted, 54 is obtained as the sum of load estimated values.

Using the unit load estimated value table and the load sum value, the processing responsibility range assignment means 14 divides the total number 54 of loads by the number of drawing processing means 15 as in the case of the embodiment 1 to calculate the load quantity to be assigned to one drawing processing means 15, then sequentially assigns processing of a unit drawing area while adding the unit load estimated value sequentially from the unit drawing area R1 until the load quantity assigned to one drawing processing means 15 is reached.

If the number of drawing processing means 15 is three, a load quantity assigned to one drawing processing means 15 is 18. The result of assignment of a responsibility range to each drawing processing means 15 by the processing responsibility range assignment means 14 is shown in FIG. 60. As a result, a range from R1 to R7 is assigned to the drawing processing means A, a range from R8 to R10 is assigned to the drawing processing means B, and a range from R11 to R16 is assigned to the drawing processing means C.

Embodiment 11

In the embodiments having been described so far, a load estimated value F has been expressed by the following expression: F=Σ (coefficient×unit load estimated value). However, a constant time not dependent on unit load estimated values is required to process unit areas. That is, a load estimated value F must be expressed by the following expression: F=Σ (coefficient×unit load estimated value+constant).

To be more specific, as shown in FIG. 61, a unit load estimated value is not initialized to 0, but to a constant to be added. FIG. 61 shows an example of a constant value of 0.2. Subsequent processing can be performed according to the embodiments having been described so far. Alternatively, with a unit load estimated value table initialized to 0, after unit load estimated values are also calculated in the same way, using the unit load estimated value table and a load sum value, the processing responsibility range assignment means may divide the total number of loads by the number of drawing processing means as in the case of the embodiment 1 to calculate the load quantity to be assigned to one drawing processing means, then sequentially assigns processing of a unit drawing area while adding the unit load estimated value and a constant sequentially from the unit drawing area R1 until the load quantity assigned to one drawing processing means 15 is reached.

Embodiment 12

In the embodiments having been described so far, although unit load estimated values have been directly used for calculation, results suitable for a function may be used. For example, this is true for the case where the parameter to be used as a unit load estimated value is not linear and the results of applying log would be more useful if used. Any type of functions may be used.

This terminates the explanation of the embodiments of the present invention. The present invention is not limited to the above-mentioned detailed descriptions and can be subjected to various changes without departing from the spirit thereof. For example, although the foregoing description centers on drawing elements, other drawing processing can be dispatched taking into account other factors as well. Any factors are permitted if they exert influence on drawing processing; clip elements (clip objects) can be taken into account. A load reference has been set common among a plurality of drawing processing means on the assumption that the plurality of drawing processing means have the same performance. However, the load reference of drawing processing means can be changed in accordance with the performance of the drawing processing means and various factors.

Figure 3:
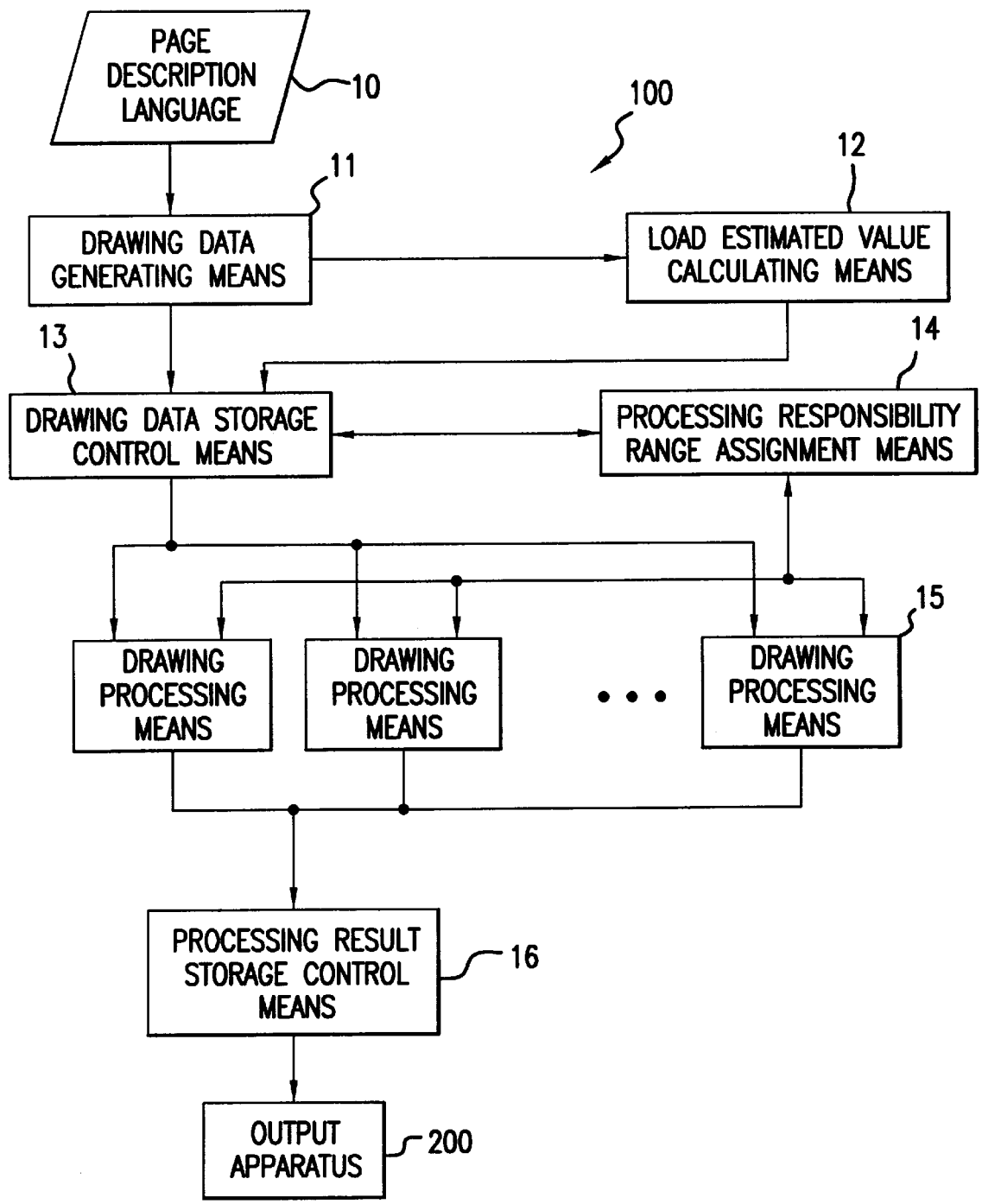
FIG. 3 illustrates the principle of a drawing processing apparatus according to the present invention.
Figure 4:
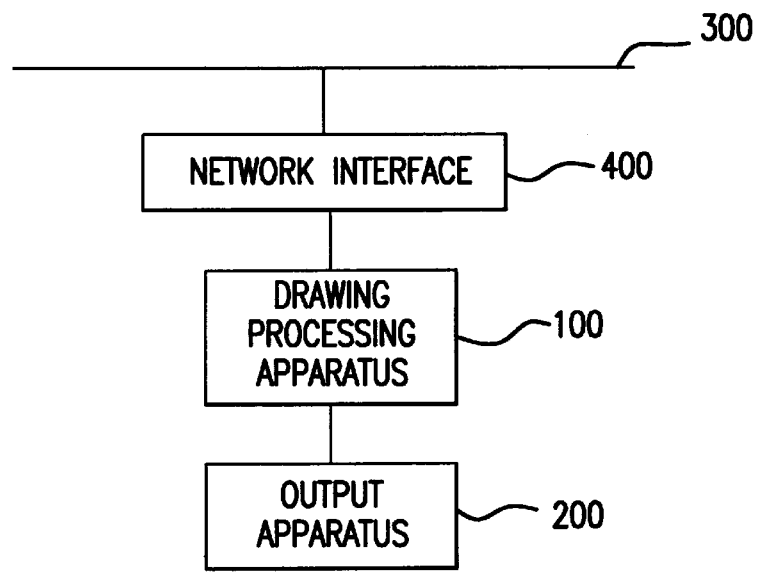
FIG. 4 is a conceptual diagram of a drawing processing apparatus system of the present invention.
Figure 5:
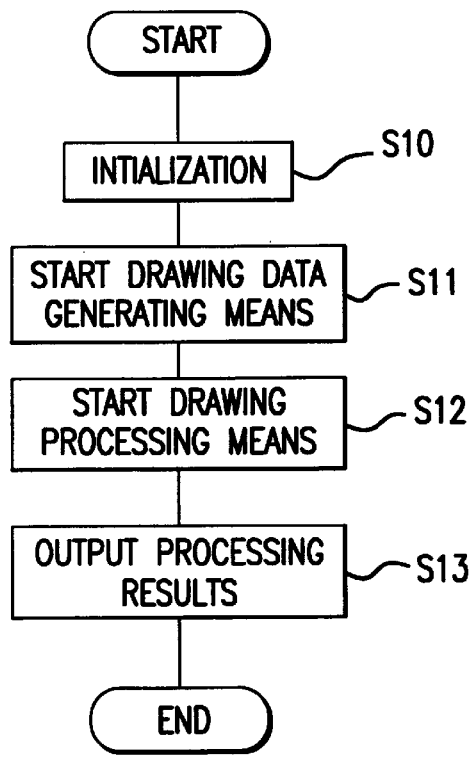
FIG. 5 is a flowchart showing the flow of the processing of the drawing processing apparatus according to the present invention.

The present invention can be subjected to various changes without being limited to the foregoing description. For example, the drawing data generating means 11 shown in FIG. 3 need not be in the same place as the drawing processing means 15, and may be connected via a network. In this case, the drawing processing means 15 has means for receiving drawing data produced by coding in a prescribed page description language a drawing object on a page comprised of a prescribed number of scanning lines. For example, the drawing data generating means, the load estimated value calculating means 12, the drawing data storage control means 13, and the processing responsibility range assignment means 14 shown in FIG. 3 need not be in the same place as the drawing processing means 15, and may be connected via a network. In this case, the drawing processing apparatus comprises load estimated value calculating means for forming a plurality of drawing elements containing at least part of the drawing object from the drawing object of drawing data produced by coding in a prescribed page description language the drawing object on a page comprised of a prescribed number of scanning lines, and for obtaining load estimated values in accordance with the prescribed attributes of the drawing elements, drawing element generating means for splitting the page into partial drawing processing areas based on the load estimated values and a reference value on loads, and for generating a plurality of groups of the drawing elements required for drawing processing in the partial drawing areas, and transfer control means for transferring the drawing elements required for drawing processing in the partial drawing areas, generated by the drawing element generating means, to different the drawing processing means respectively.

As described above, according to the present invention, splitting a drawing processing area by using load estimated values equalizes a load on each drawing processing means and reduces the number of wait states, thereby achieving quick drawing processing.

What is claimed is:

1. A drawing processing apparatus, comprising:

input means for inputting drawing data produced by coding in prescribed drawing instructions a drawing object on a page composed of a prescribed number of scanning lines;

load estimated value calculating means, on the basis of said drawing data inputted to said input means, for calculating a load estimated value in response to existence frequency of vectors constituting the outline of at least said drawing object on each of said scanning lines;

a plurality of drawing processing means for drawing said drawing object;

processing area assignment means, on the basis of said load estimated value and a load reference value, for splitting said page into a plurality of partial drawing processing areas and assigning said partial drawing processing area to each said drawing processing means;

transfer control means for transferring said vectors required for drawing processing in said partial drawing processing area assigned by said processing area assignment means to said corresponding drawing processing means; and output means for synthesizing and outputting the results of drawing processing by each said drawing processing means.

2. The drawing processing apparatus according to claim 1, wherein said processing area assignment means assigns an area determined by said scanning lines, corresponding to said load estimated value, to each said drawing processing means until the sum of said load estimated values calculated by said load estimated value calculating means reaches said reference value.

3. The drawing processing unit according to claim 1, wherein said reference value is determined based on a value obtained by dividing the accumulated total load estimated value of said drawing data, obtained in accordance with said load estimated values calculated by said load estimated value calculating means, by the number of said drawing processing means.

4. The drawing processing unit according to claim 3, wherein said transfer control means repeatedly transfers said vectors required for drawing processing in said partial drawing area to said corresponding drawing processing means, and said reference value is determined based on a value resulting from further division of a value obtained by dividing said accumulated total load estimated value by the number of said drawing processing means, by the number of repeated transfers by said transfer control means.

5. The drawing processing unit according to claim 1, or wherein said load estimated value is calculated in response to existence frequency of vectors respectively constituting the outline of said drawing object and the outline of clip object, on each of said scanning lines.

6. A drawing processing apparatus, comprising:

input means for inputting drawing data produced by coding in a prescribed page description language a drawing object on a page composed of a prescribed number of scanning lines;

load estimated value calculating means for forming a plurality of drawing elements containing at least part of said drawing object from said drawing object of said drawing data inputted to said input means, and for finding load estimated values in accordance with the prescribed attributes of the drawing elements;

a plurality of drawing processing means for performing drawing processing on said drawing object;

processing area assignment means for splitting said page into partial drawing processing areas on the basis of said load estimated values calculated by said load estimated value calculating means and a load reference value, and for assigning said partial drawing processing area to each said drawing processing means;

transfer control means for transferring said drawing element required for drawing processing in said partial drawing processing area assigned by said processing area assignment means to said corresponding drawing processing means; and output means for synthesizing and outputting the results of drawing processing by each said drawing processing means.

7. The drawing processing apparatus according to claim 6, wherein said drawing element is a trapezoidal graphic.

8. The drawing processing apparatus according to claim 7, wherein the prescribed attribute of said drawing element is the area of said trapezoid.

9. A drawing processing apparatus, wherein the prescribed attribute of said load estimated value calculating means is existence frequency of said trapezoid on each of said scanning lines.

10. The drawing processing apparatus according to claim 6, wherein said drawing element is a minimum rectangle surrounding at least part of said drawing object, and the prescribed attribute of said load estimated value calculating means is the area of said rectangle.

11. The drawing processing apparatus according to claim 6, wherein said drawing element is run-length data.

12. The drawing processing apparatus according to claim 11, wherein the prescribed attribute of said load estimated value calculating means is the run length of said run-length data.

13. The drawing processing apparatus according to claim 11, wherein the prescribed attribute of said load estimated value calculating means is existence frequency of said run-length data on each of said scanning lines.

14. The drawing processing apparatus according to claim 6, wherein said drawing element contains at least any one of vector data, a trapezoidal graphic, run-length data, and one of minimum rectangles surrounding at least part of said drawing object, and the prescribed attribute of said load estimated value calculating means is determined using at least any one of the values of the existence frequency of vector data on each of said scanning lines, the area of trapezoidal graphic, the existence frequency of trapezoidal graphic on each of said scanning lines, the run length of run-length data, the existence frequency of run-length data on each of said scanning lines, and the area of said minimum rectangle surrounding at least part of said drawing object.

15. The drawing processing apparatus according to claim 6, wherein the prescribed attribute of said load estimated value calculating means is different for each of the types of painting said drawing elements.

16. A drawing processing apparatus, comprising:

input means for inputting drawing data produced by coding a drawing object in prescribed drawing instructions on a page basis;

load estimated value calculating means for calculating a load estimated value in a configuration unit of said page on the basis of said drawing data inputted to said input means;

a plurality of drawing processing means for performing drawing processing for said drawing object;

processing area assignment means, on the basis of said load estimated values calculated by said load estimated value calculating means and a load reference value, for splitting said page into partial drawing processing areas and assigning said partial drawing processing area to each said drawing processing means;

transfer control means for transferring said drawing element required for drawing processing in said partial drawing processing area assigned by said processing area assignment means to said corresponding drawing processing means; and output means for synthesizing and outputting the results of drawing processing by each said drawing processing means.

17. A drawing processing method, comprising the steps of:

inputting drawing data produced by coding in a prescribed page description language a drawing object on a page composed of a prescribed number of scanning lines;

forming a plurality of drawing elements containing at least part of the drawing object from the drawing object of said inputted drawing data, and obtaining load estimated values in accordance with the prescribed attributes of the drawing elements;

splitting said page into partial drawing processing areas on the basis of said load estimated values and a load reference value, and assigning said partial drawing processing area to each of a plurality of drawing processing means;

transferring said drawing element required for drawing processing in assigned said partial drawing area to said corresponding drawing processing means; and synthesizing and outputting the results of drawing processing by each said drawing processing means.

18. A drawing processing apparatus, comprising:

means for receiving drawing data produced by coding in a prescribed page description language a drawing object on a page composed of a prescribed number of scanning lines;

load estimated value calculating means for forming a plurality of drawing elements containing at least part of the drawing object from the drawing object of received said drawing data, and for obtaining load estimated values in accordance with the prescribed attributes of the drawing elements;

a plurality of drawing processing means for performing drawing processing;

processing area assignment means for splitting said page into partial drawing processing areas on the basis of said load estimated values and a load reference value, and for assigning said partial drawing processing area to each of a plurality of drawing processing means;

transfer control means for transferring said drawing element required for drawing processing in assigned said partial drawing processing area to said corresponding drawing processing means; and means for synthesizing and outputting the results of drawing processing by each said drawing processing means.

19. A drawing processing apparatus, comprising:

load estimated value calculating means for forming a plurality of drawing elements containing at least part of a drawing object from the drawing object of drawing data, said drawing data being produced by coding in a prescribed page description language the drawing object on a page composed of a prescribed number of scanning lines, and for finding load estimated values in accordance with the prescribed attributes of the drawing elements;

drawing element creating means for splitting said page into partial drawing processing areas on the basis of said load estimated values and a load reference value, and creating a plurality of sets of said drawing elements required for drawing processing in said partial drawing areas; and transfer control means for transferring said drawing elements required for drawing processing in said partial drawing areas to different said drawing processing means respectively, said drawing elements being created by said drawing element creating means.

* * * * *